(12) United States Patent
Fukumori

(10) Patent No.: US 7,421,596 B2
(45) Date of Patent: Sep. 2, 2008

(54) DISK ARRAY SYSTEM

(75) Inventor: Mitsuo Fukumori, Odawara (JP)

(73) Assignee: Hitachi, Ltd., Tokyo (JP)

( * ) Notice: Subject to any disclaimer, the term of this patent is extended or adjusted under 35 U.S.C. 154(b) by 463 days.

(21) Appl. No.: 11/104,518

(22) Filed: Apr. 13, 2005

(65) Prior Publication Data

US 2006/0190747 A1 Aug. 24, 2006

(30) Foreign Application Priority Data

Feb. 22, 2005 (JP) ............................. 2005-044960

(51) Int. Cl.
G06F 1/00 (2006.01)
G06F 1/26 (2006.01)
G06F 1/32 (2006.01)
(52) U.S. Cl. ..................... 713/300; 713/320; 713/323; 713/340
(58) Field of Classification Search ............... 713/300, 713/320, 323, 340
See application file for complete search history.

(56) References Cited

U.S. PATENT DOCUMENTS 5,673,412 A * 9/1997 Kamo et al. ................ 711/114
6,438,647 B1 * 8/2002 Nielson et al. ............... 711/113

FOREIGN PATENT DOCUMENTS

JP 09-325836 6/1996

* cited by examiner

Primary Examiner—Thuan N Du
Assistant Examiner—Michael J Brown
(74) Attorney, Agent, or Firm—Reed Smith LLP; Stanley P. Fisher, Esq.; Juan Carlos A. Marquez, Esq.

(57) ABSTRACT

In a disk array system, multiplexed clusters and multiplexed power source units for supplying power sources to the respective clusters are arranged. Each cluster has a power failure judging unit for judging the power source condition of other cluster. In response to a case where one cluster stops its operation first owing to a power failure, at the power failure, for example, MP of the cluster blocks the portion of the other cluster, and judges the power source condition of the other cluster on the basis of a signal from the power failure judging unit, and records power failure information showing the power source condition to a memory. At power recovery, if the cluster recognizes that the portion in blocked condition of the other cluster is in blockage owing to the power failure, the cluster recovers the portion.

18 Claims, 12 Drawing Sheets

<POWER FAILURE PATTERN (2)>

DISK ARRAY SYSTEM

CROSS-REFERENCE TO RELATED APPLICATION

The present application claims priority from Japanese Patent Application No. JP 2005-44960 filed on Feb. 22, 2005, the content of which is hereby incorporated by reference into this application.

TECHNICAL FIELD OF THE INVENTION

The present invention relates to a disk array system that has a storage device such as a hard disk drive (HDD) and a storage control device to control data storing to the storage device (hereinafter, referred to as DKC) and enables RAID control, more specifically, it relates to a technology for recovery at power failure and recovery.

BACKGROUND OF THE INVENTION

In a conventional disk array system, a structure having multiplexed DKCs and multiplexed power source units for supplying power source thereto is adopted for securing reliability. For example, a structure may be made so that a DKC is multiplexed, i.e., made into logical clusters (for example, CL1 and CL2), and 2 systems of power source units (for example, PS1 and PS2) are arranged to correspond thereto. From the PS1 and PS2, DC power sources (for example, DC1 and DC2) are supplied respectively to the clusters CL1 and CL2 of the DKC. In the above multiplexed structure example, even when one DC power source supply is suspended owing to a power failure or the like, the DKC is continuously operated by use of the other DC power source supply. Further, in the case where a battery is arranged to each of the power source units, even when the DC power source supply is stopped, the DKC is continuously operated by battery backup function. When both the DC power source supplies are stopped, both the clusters stop their operation. When the DC power source supplies are restarted at power recovery, by intervention of maintenance workers' operation, recovery processing by the clusters of the DKC is carried out, thereafter the DKC operation is restarted.

In Japanese Patent Application Laid-Open Publication No. 9-325836, an example of technologies for recover is described. It is described that, in this technology, control output is so made that devices to be power recovery objectives are recovered to their conditions before power failure, according to the power failure and recovery conditions of power sources, and device conditions before power failure are used as information for device recovery.

SUMMARY OF THE INVENTION

In the multiplexed structure example, when both the DC power source supplies are stopped at a power failure, both the clusters stop their operation, however, at the moment, there will be a difference in DC power source stop timings from the respective power source units, accordingly, there will be a difference in operation stop timings of the respective clusters. Herein, the portion of the cluster that stops first is shifted to its blocked condition, by blocking processing by the cluster that stops thereafter. When the DC power source supplies are restarted at power recovery, both the clusters are restarted, however by the blocking processing at the power failure, the portion of one cluster is in its blocked condition. Accordingly, by intervention of maintenance workers' operation, recovery processing must be carried out to the portion of the cluster. However, the recovery procedures by intervention of maintenance workers' operation in this manner are troublesome, which has been a problem in the prior art.

The present invention has been made in consideration of the above problem with the prior art, accordingly, an object of the present invention is to provide a technology that, in a disk array system of a structure where power source units and DKCs to become power source supply objective from the power source units are multiplexed, enables to remove troublesome procedures by intervention of maintenance workers for recovery at the power failure and recovery, and to realize recovery in a short time, recovery by a low cost structure, and recover with low DKC process load.

The outline of a representative one among embodiments disclosed in the present invention is briefly explained as below. In order to achieve the above object, a disk array system according to the present invention is characterized by having a storage device and a storage control device (DKC) and enabling RAID control, and having technical means shown below.

The disk array system according to the present invention has a structure having clusters by multiplexed DKCs, and multiplexed power source units that supply power sources to the clusters. For example, it is a structure having duplexed clusters, and duplexed power source units that supply DC power source supplies thereto. AC power sources of plural systems are input to the respective power source units and AC-DC converted and DC power sources are output. From a first power source unit to a first cluster, a first DC power source is supplied, and from a second power source unit to a second cluster, a second DC power source is supplied.

Each of the power source units is of a structure having, for example, an AC-DC power source unit (hereinafter, PS). Each PS is of a structure having plural switching power sources (SWPSs). In each PS, AC power sources of different systems are input to the respective SWPSs, and respectively AC-DC converted, and DC power sources for the clusters corresponding to the PS are supplied. In the respective SWPSs, owing to a difference in their power failure durable properties, there is a difference in DC output stop timings at AC input stop by a power failure.

Each of the DKC clusters carries out a data input/output process to memory volumes on a storage device, according to a data input/output request from other devices such as a host computer connected for communications (hereinafter, host). Each of the clusters has at least a portion of a processor and a memory. The above memory includes a nonvolatile memory. The processor of each cluster carries out a control to the memory in its own cluster, and may communicate with the processor of the other cluster, and may control the memory of the other cluster.

Each of the DKC clusters is of a structure having, for example, a channel controlling unit that carries out a communication interface process with other devices, a disk controlling unit that carries out a communication interface process with the storage device, a cache memory unit for data cache, a shared memory unit for storing control information, and a connecting unit that connects the above units mutually. The channel controlling unit and the disk controlling unit have a processor. In the clusters, condition information is read from and written onto a shared memory by the processor, and the control at power failure and recovery is executed.

As patterns at power failure and recovery, there are followings that occur by the difference in power source supply stop timings in the power source units. As a first power failure pattern, there is a case where all the plural clusters stop their operation at a relatively long power failure. For example, in a structure of duplexed clusters, one cluster stops first, and the other cluster stops thereafter, as a result, both the clusters come to stop their operation. Meanwhile, as a second power failure pattern, there is a case where at a short power failure, some of plural clusters stop their operation, but others continue their operation. For example, in a structure of duplexed clusters, one cluster stops first, and the other cluster does not stop but recovers, as a result, only one cluster stops its operation. In the present disk array system, a first control corresponding to the above first power failure pattern, and a second control corresponding to the above second power failure pattern may be carried out.

In the present disk array system, in a multiplexed structure of the power source units, and clusters having the processor and the memory, there is means for judging the power source conditions or power failure conditions of the respective clusters. The present means is realized by a circuit such as a power failure judging unit arranged in the disk array system, and a power failure judging process by the processor of the clusters and so forth. On the above memory, by the processor, information for controlling the blockage/recovery conditions of the portions of the clusters, and information for controlling the power source conditions of the clusters are controlled as condition information.

In the first or second control, as a control at power failure, the operating cluster carries out the blocking process on the portion of the other cluster in stoppage, on the basis of the blockage judgment, and judges the power source condition of the portion of the above other cluster, by means for judging the above power source conditions. Then, the operating cluster records the information showing the blockage condition at that time and the information showing the power source condition in a corresponded form as condition information to the nonvolatile memory. Then, as a control at power recovery, when the operating cluster judges and recognizes that the portion in the blocked condition in the above other cluster is in its blocked condition owing to or at a power failure, the operating cluster carries out an automatic recovery of the portion. Meanwhile, when the operating cluster judges that it is not in its blocked condition owing to a power failure, the operating cluster does not carry out the automatic recovery of the portion. Thereby, the clusters may be recovered to their normal operation without intervention of operators.

In the control, in the blocking process, for example, blockage information showing the blocked condition of the portion is written into the nonvolatile memory in the continuously operating cluster. Further, in the judgment of the power source condition, for example, the processor of the continuously operating cluster recognizes the power source condition of the cluster by the power failure judgment according to the detection of signals from the circuit of the power failure judging unit, at the same time as or just before or just after the execution of the blockage process, and writes the power failure information in the case of power failure condition, into the nonvolatile memory of the continuously operating cluster. Further, in the recovery process, for example, the blockage information on the memory is updated so as to release the blocked condition of the portion of the cluster, and memory copy processing is carried out so as to make same the contents of the memory between the clusters.

(1) In the first control, as the control at power failure, the processor of the first cluster continuously operating just after the power failure blocks the portion of the second cluster that has stopped its operation first, and judges the power source condition of the second cluster, and records and stores the information showing the power source condition of the second cluster into the nonvolatile memory in the cluster. Then, the first cluster's operation is stopped too. Then as the control at power recovery, when plural clusters are restarted by the power recovery, just after then, the processor of the first cluster recovers the portion in the blocked condition of the second cluster, on the basis of the information stored in the nonvolatile memory, when it recognizes that the blocked condition is the block condition owing to power failure.

(2) In the second control, as the control at power failure, the processor of the first cluster continuously operating just after the power failure blocks the portion of the second cluster that has stopped its operation, and judges the power source condition of the second cluster, and records and stores the information showing the power source condition of the second cluster into the nonvolatile memory in the cluster. Then, power recovery is made before the first cluster's operation is stopped. Then as the control at power recovery, after the blocking process, because the processor of the first cluster recognizes that the portion of the blocked condition in the second cluster is caused by the power failure, it periodically carries out access for action soundness check, and recovers the portion, when there is no problem in the check result. The access for the check may be carried out before the power recovery, or may be done after the power recovery.

(3) Further, in a display array device according to the present invention, means for judging the power source condition of the clusters is structured inside by a circuit such as a power failure judging unit. The circuit of the power failure judging unit is a circuit that, for example, on the basis of the supply condition of DC power source or AC power source in the power source unit, outputs signals showing the power source conditions of the clusters to the processors of the clusters. The respective processors recognize the power source condition of other cluster by detecting the signals showing the power source conditions.

The means for judging the power source condition is, as a first structure example, of a structure where a circuit of the power failure judging unit is arranged in each cluster, and each circuit of the power failure judging unit inputs DC power source from the power source unit of other cluster, and outputs signals showing power failure judgment results, to the processors in the clusters. The signals showing the power source condition or the power failure condition are power failure signals that, for example, become active in power failure condition where power source supply is stopped, and become inactive in non power failure condition. By detection of the signals, the processor judges the power failure condition of other cluster, at the time of blocking processing.

The means for judging the power source condition is, as a second structure example, of a structure where a circuit of the power failure judging unit is arranged between the power source unit and the cluster, and the circuit of the power failure judging unit inputs AC power source in the power source unit, and outputs signals showing power failure judgment results, to the processor in each cluster. By detection of the signals, the processor judges the power failure condition of other cluster, at the time of blocking processing.

Effects to be obtained by the representative one among embodiments disclosed in the present invention are briefly explained as below. According to the present invention, it is possible to remove troublesome procedures by intervention of maintenance workers for recovery at the power failure and recovery, and to realize recovery in a short time, recovery by a low cost structure, and recover with low DKC process load.

BRIEF DESCRIPTIONS OF THE DRAWINGS

Figure 11:
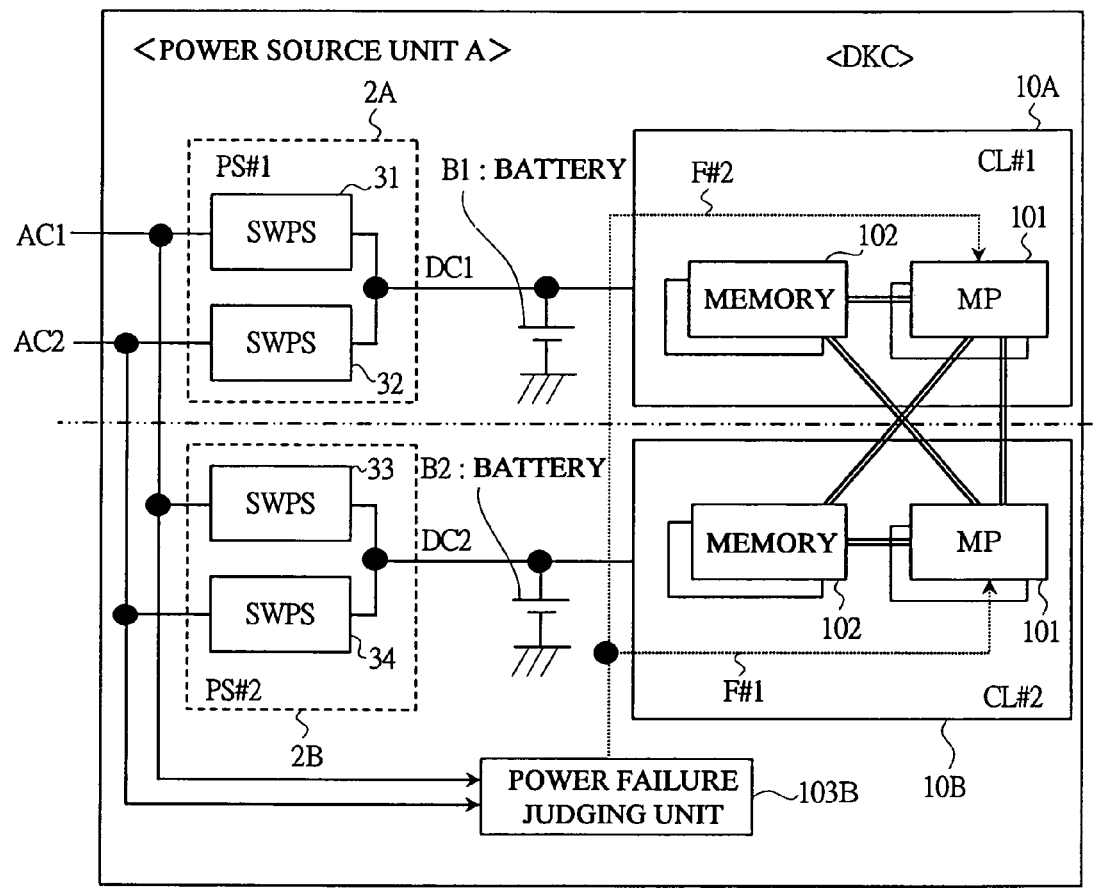
Figure 12:
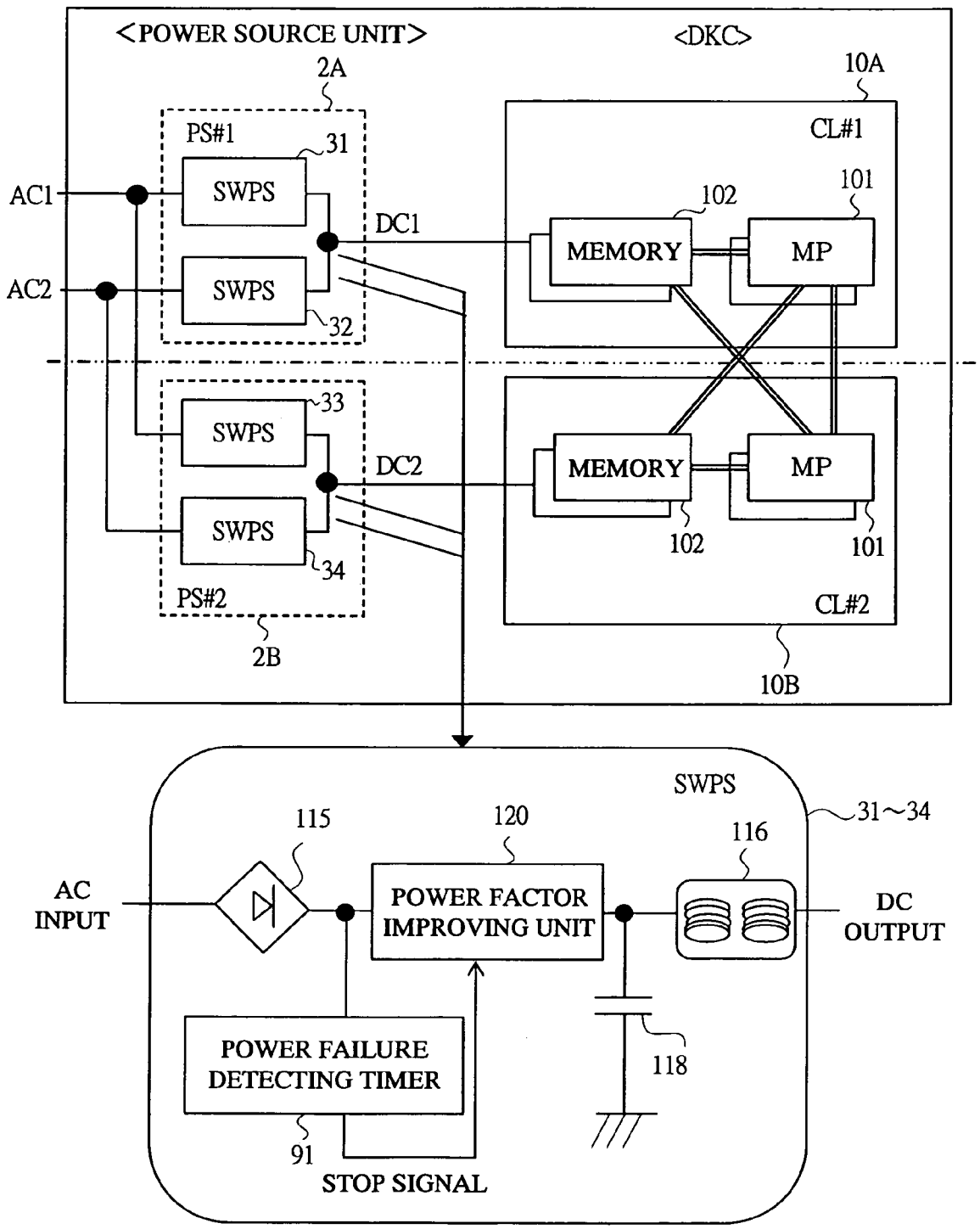

FIG. 11 is an explanatory figure showing a structure of a DKC and a power source unit having a battery, as a structure for coping with occurrence of blocked condition at power failure, as a comparative example (2) with the embodiment that the authors of the present invention have examined; and FIG. 12 is an explanatory figure showing a structure of a DKC and a power source unit to which an exclusive circuit is arranged, as a structure for coping with occurrence of blocked condition at power failure, as a comparative example (3) with the embodiment that the authors of the present invention have examined.

DESCRIPTION OF THE PREFERRED EMBODIMENTS

Preferred embodiments according to the present invention are illustrated in more details by reference to the attached drawings hereinafter. In all the drawings for explaining the preferred embodiments, in principle identical numerals and symbols are assigned to same components, and repeated explanations thereof are omitted. FIG. 1 through FIG. 12 are figures for explaining a disk array system of embodiments according to the present invention. The disk array system of the embodiment according to the present invention, in a duplexed structure of DKCs and power source units, may carry out a first control and a second control. In a first embodiment, a function to execute the first control is equipped. In a second embodiment, a function to execute the second control is equipped. In the respective embodiments, the hardware structure to become basic is same. In the first and second controls, at occurrence of blocked condition in the portion of clusters at power failure, power failure condition is recognized by power failure judgment and is stored as condition information, and at power recovery, automatic recovery processing is carried out on the portion in the blocked condition. In each embodiment, a structure of a circuit for judging a power failure is arranged.

First Embodiment

FIG. 1 through FIG. 6 are figures for explaining a display array device 1 of the first embodiment according to the present invention. In the first embodiment, in a duplexed structure of DKCs and power source units, as the first control, power failure control and power recovery control are carried out, to cope with operation stop of clusters of DKCs at occurrence of a relatively long power failure. In the power failure control, at blockage processing to the portion of the cluster that has stopped first, by the cluster that stops thereafter owing to the difference in stop time, power failure condition is recognized on the basis of the power failure judgment, and condition information where the occurrence of the blocked condition and the power failure condition are related together with each other is stored into a nonvolatile memory. Then, in the power recovery control, among both the clusters that have restarted, when the cluster at the side in normal condition recognizes that the blocked condition is owing to a power failure, concerning the portion in blocked condition in the cluster, from the stored condition information, it automatically recovers the portion. In the first control, the restarted cluster recognizes the cause/circumstance of occurrence of the blocked condition from the stored condition information.

<Disk Array System Hardware>

Figure 1:
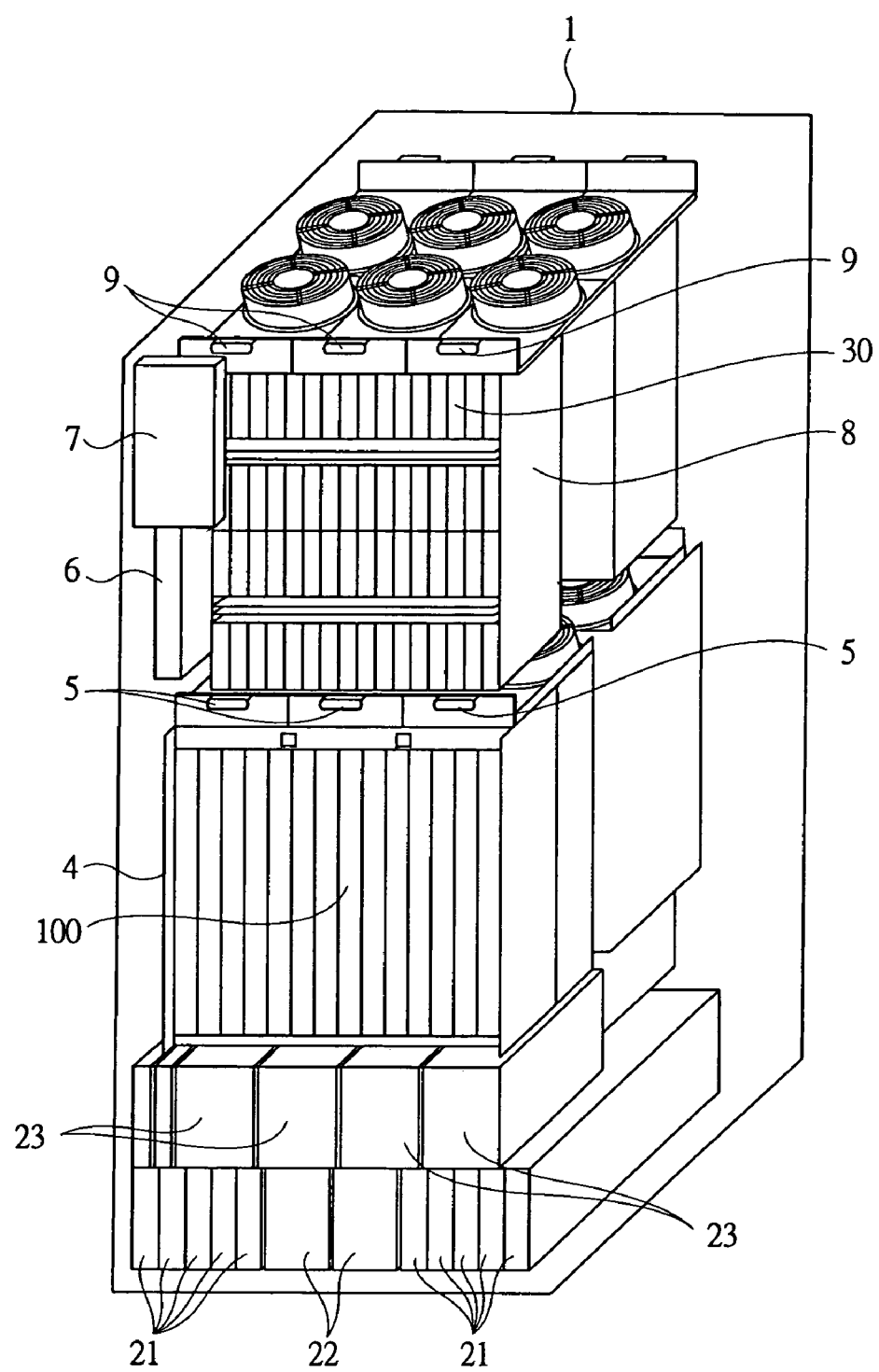
FIG. 1 is a figure showing a hardware external structure of a disk array system in an embodiment according to the present invention.

FIG. 1 is a perspective view showing the entire hardware external structure of the disk array system 1. The disk array system 1 may comprise for example a basic chassis and plural additional chassis. FIG. 1 is a view from the front right top of the basic chassis throughout the chassis, and shows an outline of arrangement of components in the chassis. The basic chassis is the minimum structure unit, and has both a memory controlling function that a DKC 10, which will be described hereinafter referring to FIG. 2, and the like carry out, and a memory function that an HDD 30 and the like carry out. Additional chassis are optional units, and have a memory function. The memory controlling function controls the memory of data such as user data to the memory area that the memory function provides and so forth, according to requests and commands from other devices such as a host connected for communications. The respective chassis are connected for communications by a communication cable.

In the basic chassis, from the bottom thereof, plural batteries 21, plural AC boxes 22, plural AC-DC power sources 23, a logic box 4, plural fans 5, an SVP 6, a panel 7, an HDD box 8, plural fans 9 and so forth are arranged.

The batteries 21 are connected to the AC-DC power sources 23, and function as backup power sources at a power failure. As described later herein, in the respective embodiments, the load of the batteries 21 is limited to the least necessary number. The AC boxes 22 are the portions to which input AC power sources of users' facility are connected, and are connected to the AC-DC power sources 23. The AC-DC power sources 23 AC-DC convert the input AC power sources, and supply DC power sources to the respective portions in the chassis including the DKC 10.

In the logic box 4, plural slots that may contain a control package 100 are arranged, and the control package may be contained and connected so as to be inserted and pulled along a guide rail and the control package 100 unit may be exchanged. The control package 100 is an integrated module where a board (circuit board) packaged with functions such as host interface is included at the center, and mechanical structures such as a canister for attaching the logic boxes 4 are added. By mutual connections of various kinds of the control packages 100, the DKC 10 is realized. In the logic box 4, a back plane board not illustrated therein for mutual connection of the control packages 100 is arranged. Connectors of the respective control packages 100 are connected to the connectors of the back plane board in the slots, and assembled in as the DKC 10.

The SVP (maintenance/control terminal) 6 is a device having a processor in charge of the maintenance/control processing of the disk array system 1. The SVP 6 has for example a form of a notebook PC, and is contained in the chassis normally, and is taken out of the front side at necessity. Maintenance workers may carry out the maintenance/control processing by operating the SVP 6. The panel 7 has switches for the basic operation of the disk array system 1, and display devices for various information displays and so forth.

In the HDD boxes 8, plural HDDs 30 are contained and connected so as to be inserted and pulled out respectively, in form of HDU (HDD unit), in parallel. The HDU is an integrated module where HDDs 30 are included, and mechanical structures such as a canister for attachment are added.

The plural fans 5 and 9 arranged in the chassis ventilate and cool down the portions in the chassis.

<Functional Block Structure of Disk Array System>

Figure 2:
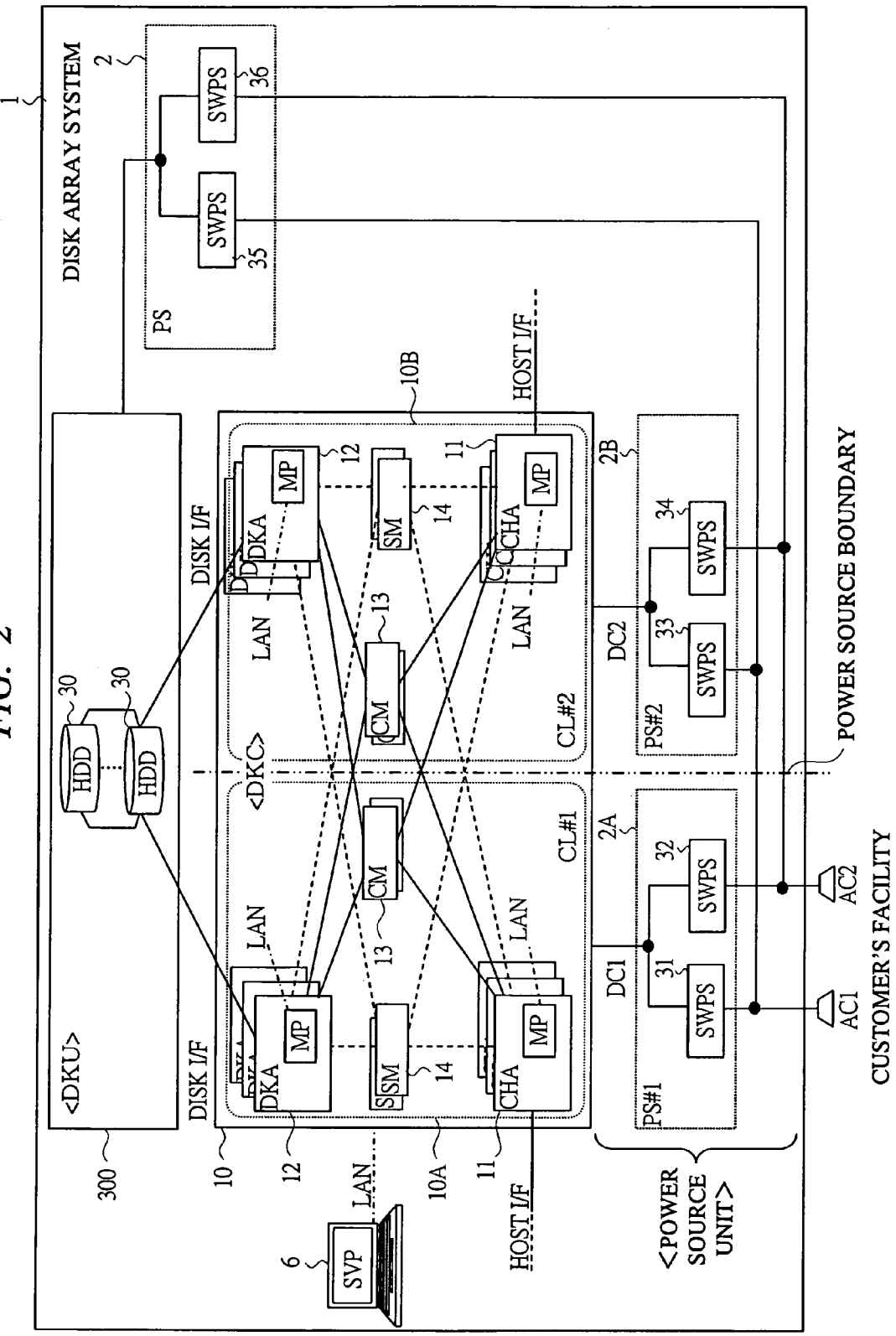
FIG. 2 is a figure showing a functional block structure of a disk array system in an embodiment according to the present invention.

FIG. 2 shows the functional block structure of the disk array system 1. As shown in FIG. 2, the disk array system 1 has a power source unit and a DKC 10 and a DKU (disk unit) 300 and a SVP 6. The power source unit and the DKC 10 and the DKU 300 are of a structure duplexed in correspondence.

The DKC 10 is of a structure duplexed by logic clusters (CL) 10A and 10B. For example, the CL (#1) 10A and the CL (#2) 10B have same function. The DKU 300 is the portion including groups of the HDDs 30. The respective CL 10A and CL 10B are connected for communications via a connection network and the like to the respective HDD 30 of the DKU 300.

The power source unit includes 2 systems of AC-DC power source units (PS) 2A and 2B to the DKC 10. In correspondence to the power source boundary, one side is structured and controlled as PS#1 (2A), and the other as PS#2 (2B). Each of the PS 2A and PS 2B is structured by duplex switching power sources (SWPS) corresponding to the AC-DC power source 23. The PS 2A has SWPSs 31 and 32, and the PS 2B has SWPSs 33 and 34. Further, in the disk array system 1, a PS 2 that supplies DC power source to the DKU 300 is arranged, and the PS 2 has SWPSs 35 and 36.

In each PS, each of 2 systems of input AC power sources (AC1 and AC2) is input and connected via the AC box 22 to duplexed SWPSs. The AC1 is input to SWPSs 31, 33 and 35, and the AC2 is input to SWPSs 32, 34 and 36. In the respective PSs 2A and 2B, AC-DC conversion is made by the respective SWPSs, and DC power sources (DC1 and DC2) are supplied to CL 10A and CL 10B of the corresponding DKC 10. The DC1 is supplied to respective portions that configure the CL 10A, and the DC2 is supplied to respective portions that configure the CL 10B. Further, to respective HDDs 30 of the DKU 300, in the same manner as to the DKC 10, DC power sources are supplied via the PS2. Even when AC input to one side is suspended, by AC input at the other side, DC power supply is continuously made by respective PSs.

The power source boundary shown in FIG. 2 shows a logic boundary in the power source unit and the DKC 10, concerning power source supply system. Power supply to the DKC 10 by the power source unit is duplexed, therefore, even when one side of the power source boundary, for example, the supply of DC1 from PS 2A to CL 10A stops, the supply of DC2 from PS 2B to CL 10B is continued at the other side, accordingly, by CL 10B at the other side, the function of the disk array system 1 is continuously supplied.

In the case of a structure where a battery 21 is further connected between the PS and the DKC 10, even at a power failure of the input AC power sources AC1 and AC2, i.e., at stoppage of the DC power source supply of PS 2A and PS 2B, power source is supplied from the battery 21, and the operation of CLs 10A and 10B may be maintained for a while.

To the disk array system 1, via communication means such as a network, an external device such as a host is connected for communications. The network is, for example, a Storage Area Network (SAN) configured by communication devices such as a switch or more conforming to fiber channel protocol. In this case, the host and a CHA 11 carry out communication processing acceding to the fiber channel protocol on the SAN. For example, a data input/output request in block unit is made from the host to the disk array system 1. Further, the DKC 10 may be connected for communications to other disk array system via the network or the like.

The host connected for communications to the disk array system 1 is an information processor in form of, for example, a PC, a work station, a server, a main frame computer, equipped with a CPU, a memory, a communication interface unit and so forth. As for the host, when various programs are executed by the CPU, various functions as a host are realized. The host has software for data input/output to the disk array system (hereinafter, referred to as control program), and application programs for information processing services by use of access to the disk array system 1 and so forth.

In the cluster structure, for example, the host is connected for communications to the CHA 11 of the CL 10A at one side, and according to a request from the host, data read/write to the HDD 30 is carried out by the DKA 12 via CM 13 and SM 14. When the CL 10A stops its operation, the process of the CL 10A may be succeeded to the CL 10B. Namely, the host is connected for communications to the CHA 11 of the CL 10B, and data read/write is carried out to the HDD 30 in the same manner.

<DKC>

The DKC 10, as a processing unit per function, has a CHA (channel controlling unit) 11, a DKA (disk controlling unit)

12, a CM (cache memory) 13, and an SM (shared memory: shared memory) 14. Each processing unit is connected for mutual communications and data transfer via a connecting unit for example a switch unit or the like. Each processing unit may be supplied by the control package 100 or other board or so.

The CHA 11 has a function as a host interface (also referred to as channel interface) to become a data input/output port with the host and other external device. Further, the DKA 12 has a function as a disk interface (also referred to as drive interface) to read and write data of the HDD 30 of the DKU 300. Each of the CHA 11 and the DKA 12 is of a structure having an MP (micro processor) and a memory, and portions such as a processing unit corresponding to each interface. When the MP executes the program, and functions as the CHA 11 and the like are realized.

Process data of the CHA 11 and DKA 12 is transferred via a CM 13 of a large capacity. An SM 14 is used for storing control information such as condition information, and is shared by respective portions in the DKC 10. The CM 13 and the SM 14 comprise a nonvolatile memory, and are backed up by the battery 21. Accordingly, even at the moment of DC power source supply stop owing to a power failure, contents including the condition information are kept without being lost.

The CHA 11 and, the DKA 12 and the CM 13 are connected by a path for data cache. The CHA 11 and the DKA 12 and the CM 14 are connected by a path for reading and writing control information. The CHA 11 and the external device such as a host computer are connected by the path of the host interface. The DKA 12 and each HDD 30 are connected by the path of the disk interface. As for the respective paths, logic paths are set according to necessity on logic lines.

Normal data input/output process by the disk array system 1 is for example as shown below. Data read/write process to memory volume in the disk array system 1 in response to a request from the host is shown. When a data input/output request that the host received from a certain CHA 11 is a data write request, the CHA 11 writes the data write request to the SM 14, and writes the write data received from the host to the CM 13. On the other hand, the DKA 12 monitors the SM 14, and when it detects that the data write request is written to the SM 14, it reads the write data from the CM 13 according to the data write request, and writes it to the HDD 30. Further, when a data input/output request that a certain CHA 11 received from the host is a data read request, whether there is data to be read in the CM 13 or not is checked. Herein, if there is the data in the CM 13, the CHA 11 sends the data to the host. On the other hand, if there is not the data in the CM 13, the CHA 11 writes the data write request to the SM 14, and monitors the SM 14. The DKA 12 that has detected that the data read request was written to the SM 14 reads out the data to be read from the HDD 30 and write it to the CM 13, and writes that to the SM 14. Then, when the CHA 11 detects that the data to be read was written to the CM 13, it sends the data to the host.

Functions in the DKC 10 may be structured in other forms. For example, the CM 13 and the SM 14 may be made into an integrally formed memory structure. Besides a structure where data write and read instructions from the CHA 11 to the DKA 12 may be made indirectly with intervention of the SM 14, for example, a structure where instructions may be made directly without intervention of the SM 14. Further, by making the CHA 11 have the function of the DKA 12, the CHA 11 may read and write data memorized in the HDD 30. Furthermore, a structure may be made where the SM 14 or CM 13 is distributed to the CHA 11 and the DKA 12.

Conditions in the disk array system 1, for example, structures of respective portions and disorder condition and process condition and so forth, are stored as needed into memories such as the SM 14 in the DKC 10 as condition information/data. In the present embodiment, the respective MPs loaded in the CHA 11 and the DKA 12 in the DKC 10 read and write the various kinds of condition information as needed to the SM 14.

<DKU>

To the DKA 12 of the DKC 10, via a connection network, respective HDDs 30 in the DKU 300 are connected for communications. The HDD 30 reads and writes data to the disk area according to the request from the DKA 12. The memory area unit in the HDD 30 is a block unit corresponding to for example LBA (logical block address). As the HDD 30, drive of various kinds of interface may be used.

By the DKC 10, memory volume is set on the HDD 30. The memory volume is memory resource for memorizing data, including a physical volume as a physical memory area provided by the HDD 30, and a logic volume as a memory area set logically on the physical volume. The logic volume is especially referred to as an LU (logic unit). Plural HDDs 30 configure disk arrays, and memory areas to the host may be supplied as RAID group controlled by RAID control. To each LU, a peculiar identifier such as LUN (logic unit number) is allotted and controlled. To the data input/output request from the host to the disk array system 1, LUN for designating objectives and LBA and so forth are described.

<SVP>

To the DKC 10, an SVP 6 is connected via an internal LAN. The SVP 6 is connected to each CHA 11 and MP of the DKA 12 by the internal LAN, and may communicate with each MP. The SVP 6 executes programs and realizes its maintenance and control process. In the present embodiment, the SVP 6 is internally connected in the disk array system 1. Further, the SVP 6 may be externally connected to the disk array system 1. Further, other maintenance and control device than the SVP 6 may be connected for communications to the disk array system 1 via a network or so. For example, a maintenance and control device to which maintenance and control process programs are installed may be used on the host that is connected for communications to the disk array system 1.

In the SVP 6, its maintenance and control functions are GUI configured so as for operators such as maintenance workers to monitor and grasp the conditions in the disk array system 1. The SVP 6, in normal operation, grasps conditions of unit structures including the DKC 10 in the disk array system 1, disorder conditions, process conditions and so forth. The condition information in the disk array system 1 is kept on the SM 14, and the SVP 6 displays various kinds of information to the display screen of the SVP 6 on the basis of the condition information on the SM 14. Further, by changing the information on the SM 14, by operation input to the SVP 6 by operators, the structure and conditions of the disk array system 1 may be changed.

In the disk array system 1, the control at power failure and recovery is automatically carried out without intervention of operators. For example, by instructing and controlling the cluster of the DKC 10 from the SVP 6, processes such as blocking process concerning the control at power failure and recovery is made by the MP of the cluster. The MP that carries out the processes is an MP that is not busy at that time, or a fixed representative MP according to some function of the disk array system 1. The MP that carries out processes reads and writes information showing blocking condition of respective portions and information showing power failure condition and so forth, as condition information, to the SM 14. For example, according to the control from the SVP 6, by use of an MP that is sound, i.e., free of disorder or blockage, it changes the contents of the condition information on the SM 14 so as to make the portion of failure stop into blocked condition. Further, by use of a sound MP, it changes the contents of the condition information on the SM 14 so as to release the blocked condition of the portion of the failure stop.

The MP, concerning to the control at power failure and recovery, carries out blocking process to shift the objective portion to the blocked condition, process to judge and store the power failure condition, recovery process to release the blocked condition and recover normal condition, and so forth. As the cause and circumstance of occurrence of blocked condition at the portion of the cluster, besides a hardware failure, there is DC power supply stop owing to power failure.

<Power Source Unit and Cluster Structure (1)>

Figure 3A:
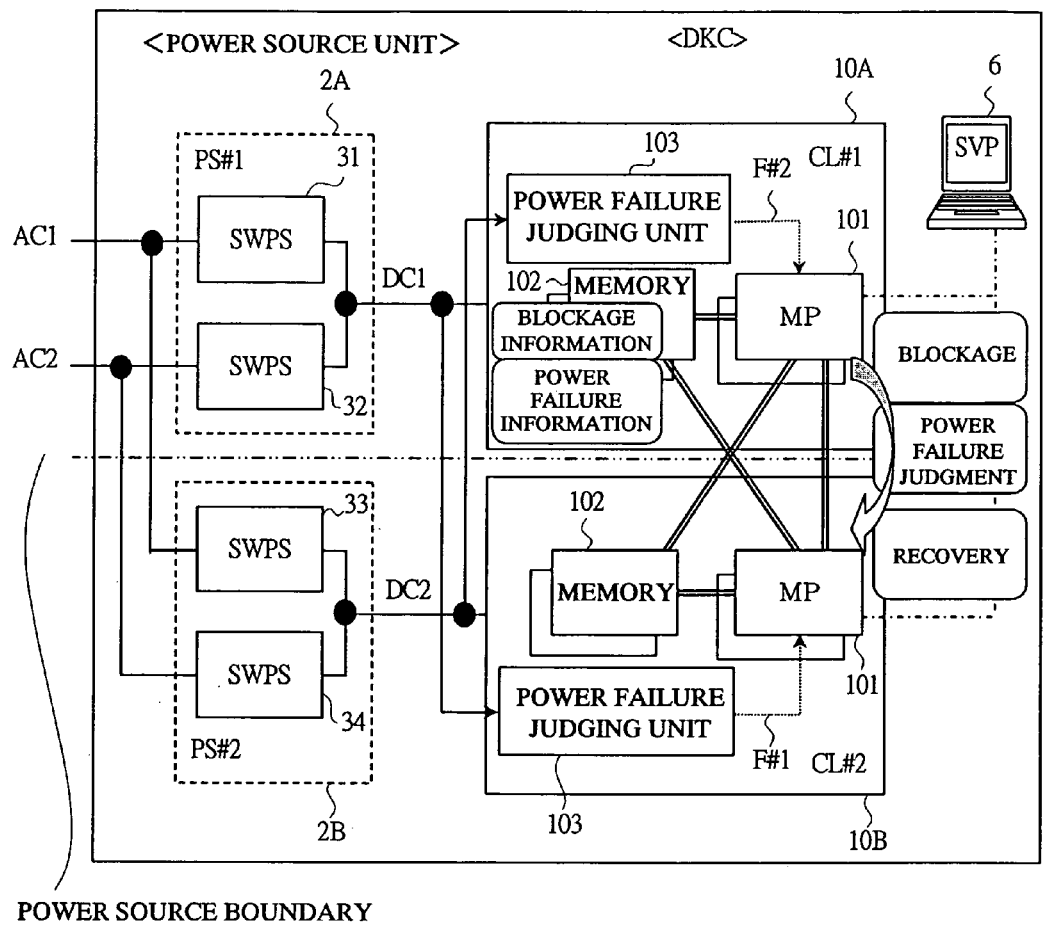
FIG. 3A is a block diagram showing a first structure example of power source units and DKC clusters, concerning control at power failure and recovery in a disk array system in an embodiment according to the present invention.
Figure 3B:
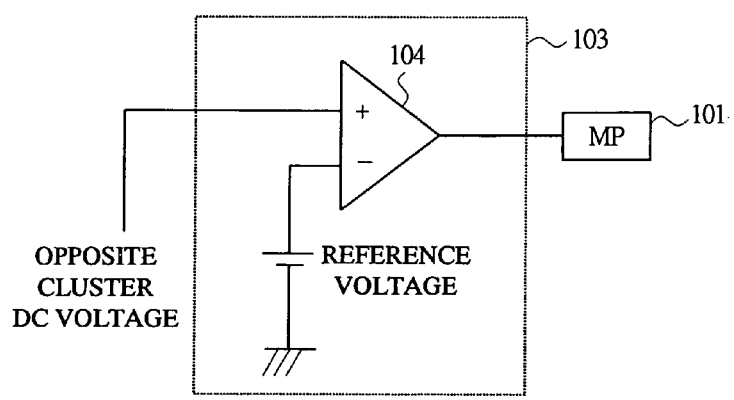
FIG. 3B is a figure showing the detailed structure of a power failure judging unit therein.

FIG. 3A and FIG. 3B are block diagrams each showing a first structure example of the power source unit and the clusters, concerning the control at power failure and recovery in the first and second embodiments. FIG. 3A shows especially the first structure example concerning means for judging power failure condition, and FIG. 3B shows detailed structure of a power failure judging unit 103 therein. In the disk array system 1, means for judging power failure condition is structured mainly by the circuit of the power failure judging means.

The present structure is a structure where, in the structure of clusters and power source units of duplexed DKCs 10, the power failure judging unit 103 is arranged in each of CLs 10A and 10B, and supply DC power sources (DC2, DC1) at the opposite clusters (CL 10B, 10A) are input, and power failure signals F (#2, #1) showing power failure condition at the opposite cluster side are output to an MP 101 in the same cluster.

When supply of AC1 and AC2 is suspended owing to a power failure, both DC1 and DC2 supplies stop, but there may be a difference in power source holding time owing to the difference in power failure durability of the SWPS 31 to 34. Therefore, there is a difference in supply stop timings of DC1 and DC2 to CLs 10A and 10B, and there may be a lag in cluster operation stop timings.

In the CLs 10A and 10B, an MP 101, a memory 102, and a power judging unit 103 are arranged. The MP 101 corresponds to the MP loaded on the CHA 11 or so. The memory 102 corresponds to the CM 13 and the SM 14. Each MP 101 may communicate with each MP 101 in its own cluster, and may read, write, and access to each memory 102 in its own cluster. Further, each MP 101 may communicate with MP 101 in other cluster, and may read, write, and access to each memory 102 in other cluster. Each MP 101 checks conditions mutually.

In the first and second controls, the MP 101 carries out blocking process at a power failure, judging process of power failure condition, recovery process at power recovery and so forth. Further, to the SM 14 as a memory 102, by the MP 101, blockage information for controlling blockage/recovery condition of respective portions, power failure information for controlling power failure condition and so forth are memorized as condition information.

The power failure judging unit 103 inputs DC power source of other cluster, i.e., the opposite cluster to become a set in the present embodiment, and judges the stop/hold of DC power source supply to be supplied to the opposite cluster, and outputs a power failure signal F showing power failure condition to the MP 101 in its own cluster. For example, in the CL 10A, the power failure judging unit 103 inputs DC2, and when the DC2 supply is not suspended without a power failure, it outputs a power failure signal F#2 showing "non power failure condition in PS#2 and CL#2", and when the DC 2 supply is suspended owing to a power failure, it outputs a power failure signal F#2 showing "power failure condition in PS#2 and CL#2" to the MP 101. This is same in the CL 10B side. By input and detection of the power failure signal F, the MP 101 may judge and recognize the power failure condition of the opposite cluster.

In FIG. 3B, the power failure judging unit 103 comprises a comparator 104. The comparator 104 inputs the DC voltage of the opposite cluster (for example DC2) to one terminal, and compares it with the reference voltage to be input to the other terminal, and outputs the result as a power failure signal F (#2) to the MP 101 in the same cluster. In the case of the present structure, power failure judgment is by the DC voltage of the opposite cluster, so it is easy to structure the circuit.

In the structure of the power source unit and cluster of the DKC 10 as shown in FIGS. 3A and 3B, as patterns of cluster operation stop and so forth owing to power failure and recovery (hereinafter, referred to as power failure patterns), there are power failure patterns (1) and (2) to be described later herein.

<Conventional Actions at Power Failure and Recovery>

For comparison, the action example at power failure and recovery in a conventional disk array system structure example is explained hereinafter. The conventional disk array system structure example is for example a structure not including the power failure judging unit 103 and the likes in the structure in FIG. 3A. When the supply if AC1 and AC2 is suspended owing to a power failure, in PS 2A, 2B, the output of DC1, DC2 stops after power source hold time according to respective power failure durability. In PS 2A, 2B, individual SWPSs 31 to 34 have fluctuations in power failure durability, namely, there are fluctuations in power source hold time at power failure. For example, when the input of AC1 in SWPS 31 is suspended owing to a power failure, the output of DC1 is held for the power source hold time according to the power failure durability of the SWPS 31, then at limit of durability, the output of DC1 stops. Therefore, at a power failure, there is a difference in supply stop timings of DC1 and DC2. As a result, there is a difference in operation stop time of the CLs 10A and 10B. For example, one of the CLs 10A and 10B stops first.

For example, in the case of a structure where SWPSs of plural vendors are used to the power source unit for cost reduction, the fluctuations of the power failure durability become further larger. On the contrary, in order to make the fluctuations small, SWPSs of a single vendor may be employed, or a special circuit for reducing the fluctuations may be added, however, in such cases, costs become higher, which is disadvantageous.

When there is a difference in durability between PS2A, PS2B to 2 clusters (CLs 10A and 10B), the portion of MP 101 and the memory 102 and the likes of cluster (for example CL 10B) corresponding to PS that reaches the durability limit first (for example PS2B) stops operation. The condition at this moment is same as one cluster stop condition. In the case of this one cluster stop condition, actions as the DKC 10 are continued at the other cluster (for example CL 10A) at the side where operation is continued. However, in the memory 102 of the CL 10B at the stop side, the contents of stored information/data are not updated, therefore, in order to keep the system normal, by control of the CL 10A at the operating side, the memory 102 is intentionally shifted to blocked condition concerning the CL 10B at the stop side. Further, the MP 101 of the CL 10B at the stop side does not respond owing to mutual condition check of the MP 101, therefore becomes blocked condition in the same manner. In this way, at the one cluster stop condition, by control of the CL 10A at the operating side, portions of respective hardware resources such as the MP 101 of the CL 10B at the stop side and the memory 102 are shifted to blocked condition.

In the case of a relatively long power failure, after the one cluster stop condition, portions of the MP 101 and the memory 102 and so forth of the CL 10A corresponding to the PS 2A that reaches durability limit after the PS 2B stop operation. As a result, both the clusters (CLs 10A and 10B) get in operation stop. Then, at power recovery, both the clusters (CLs 10A and 10B) are restarted, but the portions of the MP 101 and the memory 102 and so forth of the CL 10B at the side that stopped first are restarted in blocked condition. The portions are in blocked condition, but is not with a hardware failure, therefore, actions keep soundness.

It is necessary to recover the portions of the CL 10B that operates again in the blocked condition and recover the clusters to normal condition, however, for this recovery, in the prior art, manual recovery work has been necessary with intervention of maintenance workers. Namely, it has been necessary to recover the portions in blocked condition by changing the condition information of the SM 14 via the SVP 6. It is desirable that the recovery of the blocked condition and the recovery of clusters are carried out in a short time.

<Power Failure Pattern (1)>

Figure 4:
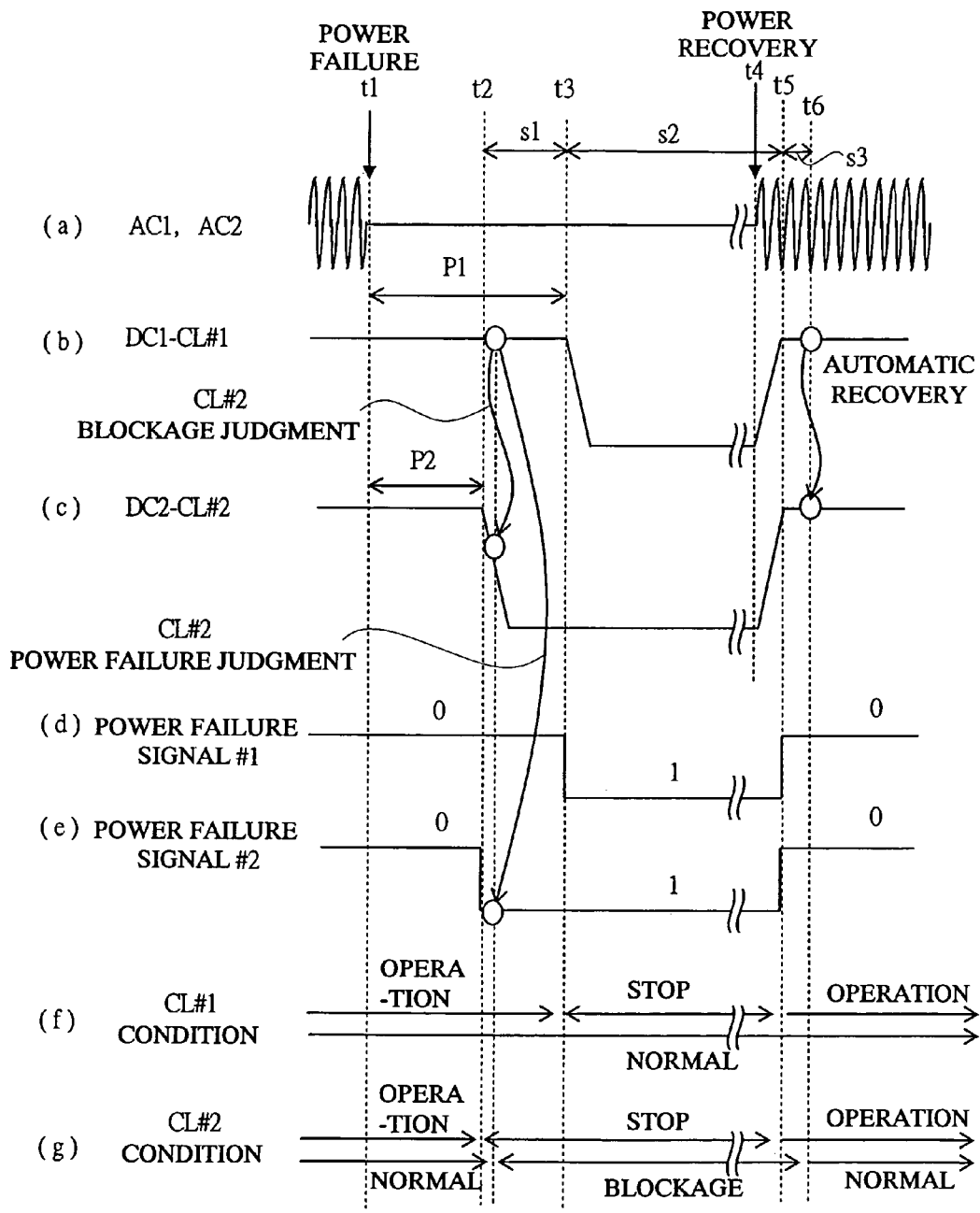
FIG. 4 is a time sequence figure showing an example of a first control corresponding to a power failure pattern (1) and a power failure pattern (1) in a first embodiment according to the present invention.

FIG. 4 is a time sequence figure showing an example of the first control corresponding to the power failure pattern (1) and the power failure pattern (1). As the power failure pattern (1), in the case where both the clusters stop owing to occurrence of a relatively long power failure, there is a case where one cluster (suppose CL 10B) stops first, and then the other cluster (suppose CL 10A) stops, as a result, both the clusters stop operation. By the difference in cluster operation stop timing, portions that become blocked condition owing to blocking process occur.

In FIG. 4, from the top, (a) shows the conditions of AC1 and AC2, (b) shows DC1 condition and CL#1 (10A) action, (c) shows DC2 condition and CL#2 (10B) action, (d) shows the power failure signal F#1, (e) shows the power failure signal F#2, (f) shows CL#1 operation and blockage condition, and (g) shows CL#2 operation and blockage condition. The symbol "t1" and the like show time. It is the case where the power failure durability of PS#1 (2A) is larger than the power failure durability of PS#2 (2B). The symbol s1 corresponds to one cluster stop condition, s2 does to both clusters stop condition, and s3 does to one cluster blocked condition.

(a) In the condition of AC1, AC2, the supply of C1 and C2 stop at occurrence of a power failure at t1. Then the supply of AC1 and AC2 restart at power recovery at t4.

(b) In DC1 condition and CL#1 action, P1 from t1 to t3 shows power source hold time by DC1 durability, i.e., power failure durability of PS 2A, and during this period, the supply of DC1 to CL#1 is continued. At t3, owing to durability limit, the supply of DC1 stops, then at power recovery at t4, the supply of DC1 is restarted at t5, and CL#1 is restarted. At the restart of CL#1, CL#1 carries out self diagnosis and restarts.

(c) In DC2 condition and CL#2 action, P2 from t1 to t2 shows power source hold time by DC2 durability, i.e., power failure durability of PS 2B, and during this period, the supply of DC2 to CL#2 is continued. At t2, owing to durability limit, the supply of DC2 stops, then at power recovery at t4, the supply of DC2 is restarted at t5, and CL#2 is restarted. At the restart of CL#2, CL#2 carries out self diagnosis and restarts.

(d) In power failure F#1, at the moment of DC1 supply stop at t3, it changes from "0" (non power failure condition) to "1" (power failure condition), and at the moment of DC1 supply restart at t5, it changes from "1" to "0".

(e) In power failure F#2, at the moment of DC2 supply stop at t2, it changes from "0" to "1", and at the moment of DC2 supply restart at t5, it changes from "1" to "0".

(f) In CL#1 condition, concerning power source, the period to t3 is operating condition, the period from t3 to t5 is stop condition, and the period after t5 is operating condition. Further, concerning blockage, it is normal condition.

(g) In CL#2 condition, concerning power source, the period to t2 is operating condition, the period from t2 to t5 is stop condition, and the period after t5 is operating condition. Further, concerning blockage, the period to blocking condition just after t2 is normal condition, the period from blocking process just after t2 to automatic recovery process just after t5 is blocked condition, and the period after automatic recovery process just after t5 is normal condition.

In the first control, in control at power failure, the MP 101 of the cluster (CL#1) at the side that operates for a while just after power failure judges blockage about the portions (the MP 101 and the memory 102) of the opposite cluster (CL#2) that stopped first after operation for a while, and at the same time, judges power failure condition about the opposite cluster (CL#2) on the basis of the power failure signal (F#2) from the power failure judging unit 103. Just before blocking process, the power failure signal F (#2) changes owing to the power failure. The cluster (CL#1) at the side that stops thereafter carries out blocking process to shift the opposite cluster (CL#2) to blocked condition according to the conventional blocking process, and in the case of power failure condition, i.e., operation stop owing to power source supply stop, it reflects power failure information showing power failure condition of the opposite cluster (CL#2) to the SM 14 of its own operating cluster (CL#1). Blockage information and power failure information are recorded to the SM 14 almost at the same time. Thereafter, the cluster (CL#1) that operates longer stops its operation owing to durability limit. Then, at power recovery, both the clusters (CL#1, #2) are restarted, but because of blocking process at the power failure, the portion of one cluster (CL#2) is in blocked condition. In the control at power recovery, when the MP 101 in normal condition of the restarted cluster (CL#1) recognizes that the portion in blocked condition of the opposite cluster (CL#2) is blocked owing to power failure, by reference to condition information including power failure information on the SM 14, it automatically recovers the portion. Meanwhile, when it judges that the cluster is not in blocked condition owing to power failure, because it is blocked condition owing to hardware failure or so, automatic recovery process is not carried out. Thereby, the cluster is recovered to normal operation without intervention of maintenance operation that was needed conventionally.

In FIG. 4, just after t2, the CL#1 at operating side carries out blockage judgment on the CL#2 at the stop side, and power failure judgment on the CL#2 by detection of the power failure signal F#2. In the blockage judgment, the CL#1 carries out blocking process to make the portions of the CL#2 to blocked condition. Further, in power failure judgment, because the power failure signal F#2 is true ("1"), it recognizes "that the CL#2 is in operation stop condition owing to DC2 supply stop". From both the judgments, the CL#1 may recognize "that the blocked condition of the CL#2 is owing to operation stop by DC2 supply stop". The CL#1 writes the blockage information and power failure information showing them to the SM 14 of the CL#1 as condition information. Further, after power recovery at t5, both the clusters CL#1, #2 are restarted, but the portion of the CL#2 is in blocked condition. Just after t5, the CL#1 reads the condition information stored in the SM 14 of the CL#1, and recognizes "that the blocked condition of the CL#2 is owing to operation stop by DC2 supply stop". Thereby, the CL#1 automatically recovers the portion of the blocked condition of the CL#2. In the recovery process, it updates the blockage information on the SM 14 of the CL#1 so as to shift the objective portion to normal condition. Further, it carries out memory copy process to make same the contents of data of the memory 102 between clusters.

<Blockage/Recovery Process>

Figure 5A:
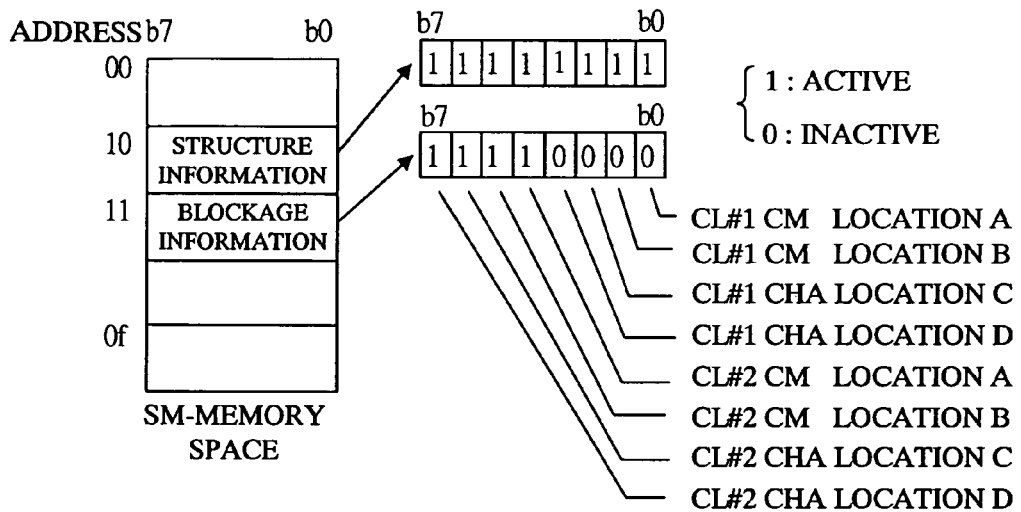
FIG. 5A is an explanatory figure showing an example of the information format used for blockage/recovery control of each portion of clusters, in each embodiment according to the present invention.

Next, the control examples of blocking process and recovery process that are executed by the CL 10A or 10B of the DKC 10 in the disk array system 1 are explained hereinafter. FIG. 5A shows an example of the format of information used for the blockage/recovery control of portions of clusters. Information used in the present example is structure information and blockage information. Herein, blockage means a logic cutoff action from the system of the disk array system 1 or the condition thereof, and recovery means a logic re-connection to the system or the condition thereof to be a pair with blockage.

In the memory space of the SM 14, the structure information in the disk array system 1 and the blockage information of respective structure portions are allotted. For example, in 8 bits of address "10" of the memory space of the SM 14, there is structure information of the CM 13 and the CHA 11, and in 8 bits of address "11" of the same, there is blockage information on corresponding portion. In the structure information and the blockage information, bit data "1" shows active, and bit data "0" shows inactive.

In the data area of each information, to each bit (b0 to b7), location in the disk array system 1 is allotted. For example, in the respective CLs 10A and 10B of the DKC 10, plural locations to which the memory 102 may connect are prepared, and to respective locations, the memory 102 portion is packaged/not packaged. In the DKC 10, respective portions in form of a control package 100 or the like are structured so as to be inserted and pulled to respective locations. In the present example, each bit (b0 to b7) in the data area of the structure information and the blockage information represents, sequentially, b0: CL#1-CM-location A, b1: CL#1-CM-location B, b2: CL#1-CHA-location C, b3: CL#1-CHA-location D, b4: CL#2-CM-location A, b5: CL#2-CM-location B, b6: CL#2-CHA-location C, and b7: CL#2-CHA-location D.

In the data area of the structure information, the portion where bit data "1" (active) is reflected shows the condition where the portions of the CHA 11 and the CM 13 and so forth are packaged to corresponding locations, and the portion where bit data "0" (inactive) shows the condition where they are not packaged. In the present example, all the 8 bits (b0 to b7) of the data area of the structure information are "1", and it shows that in the CL 10A and the CL 10B, the CM 13 and the CHA 11 are all packaged.

In the data area of the blockage information too, in the same manner, the portion of bit data "1" (active) shows the blocked condition, and the portion of bit data "0" (inactive) shows the normal condition. In the present example, in the 8 bits (b0 to b7) of the data area of the blockage condition, the CM 13 of the CL 10A and the CHA 11 show "0", i.e., normal condition. The CM 13 of the CL 10B and the CHA 11 show "1", i.e., blocked condition.

When the AND (logic product) of the structure information and the blockage information is "1", it shows that the portion at the location is in blocked condition, and when the AND is "0", it shows that the portion at the location is in normal condition.

In the present embodiment, the blocking process on objective portion means making the bit of data area of the blockage information corresponding to the location registered as "1" in the bit of data area of the structure information from "0" to "1". And the recovery process, on the contrary, means making the bit of data area of the blockage information corresponding to the location from "1" to "0".

By the way, in the present embodiment, for simplicity, in the blocking process at a power failure, all the MP 101 and the memory 102 of the cluster that stopped are shifted to blocked condition, and the entire one cluster is handled as blocked condition. Not limited to this, there may be a case where part of portion in the cluster may be made into blocked condition.

<Control of Power Failure Condition>

Figure 5B:
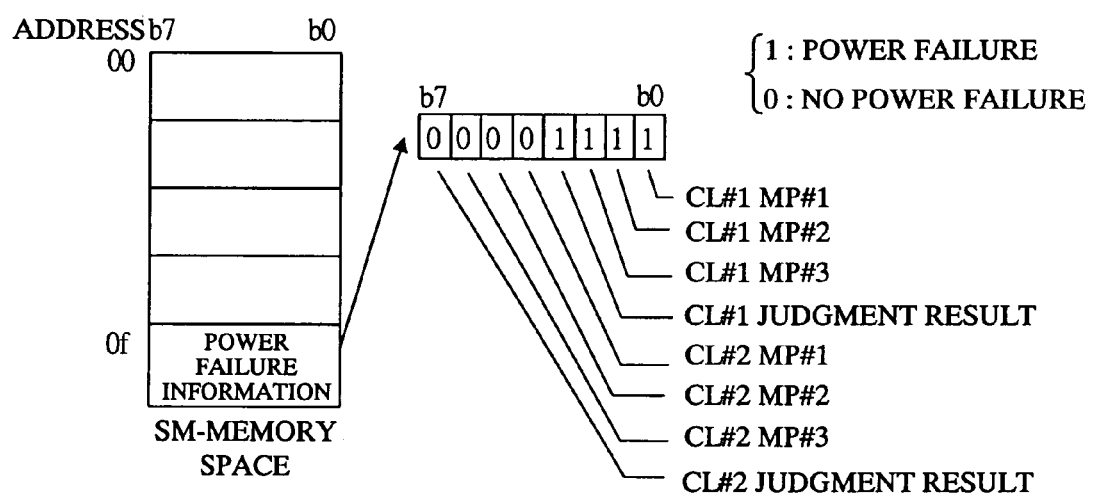
FIG. 5B is an explanatory figure showing an example of the information format used for power failure condition control.

Next, the control of power failure condition of respective power source units and clusters in the disk array system 1 is explained hereinafter. FIG. 5B shows an example of format of information used for control of power failure condition. The information used in the present example is power failure information. In order to know the cause and circumstance of blocked condition in portion of cluster, in combination with the blockage information shown in FIG. 5A, power failure information to show whether the cause and circumstance of blocked condition is owing to a power failure or not is controlled on the SM 14. Each MP 101 of cluster, on the basis of detection of the power failure signal F from the power failure judging unit 103, recognizes the power failure condition, i.e., the DC power source supply condition of the opposite cluster, and stores corresponding power failure information to the SM 14.

In the memory space of the SM 14, data area of power failure information is arranged, and each bit of this data area is allotted per the MP 101 to detect the power failure signal F. In FIG. 5B, in the address "0f" of the memory space of the SM 14, data area of power failure information is arranged. In the present example, in each bit (b0 to b7) of the data area of the power failure information, judgment results are, sequentially, b0: CL#1-MP#1, b1: CL#1-MP#2, b2: CL#1-MP#3, b3: CL#1-judgment result, b4: CL#2-MP#1, b5: CL#2-MP#2, b6: CL#2-MP#3, and b7: CL#2-judgment result. For example, it is the case where in CL#2 (10B), there are MP#1 to MP#3 (101).

In each bit (b0 to b7) of the data area of the power failure information, bit data "1" shows that the MP 101 judges that the opposite cluster is in "power failure", i.e., DC power source supply off condition. Bit data "0" shows that the MP 101 judges that the opposite cluster is in "no power failure", i.e., DC power source supply on condition. Plural MPs 101 existing in each cluster judge power failure on the opposite cluster by majority, and when they judge many are in "power failure" condition, they consider that they judge opposite cluster in "power failure" condition as cluster, and set "1" showing the condition, to the bit showing the judgment result. The information of this judgment result becomes power failure information to be used for control of cluster unit.

In the present example, in the CL 10A, each MP #1 to #3 (101) judges "21" in power failure judgment on the opposite cluster CL 10B, as a result of majority, as power failure judgment result about the CL 10B as the CL 10A, "1", i.e., "CL#2 is in operation stop condition by DC2 supply stop from PS#2 owing to power failure" is judged.

In the present embodiment, the combination of the blockage information and the power failure information is controlled on the SM 14, thereby, it is judged and recognized that the cause and circumstance of the blocked condition at the portion of each cluster is owing to a power failure.

<First Control Flow>

Figure 6B:
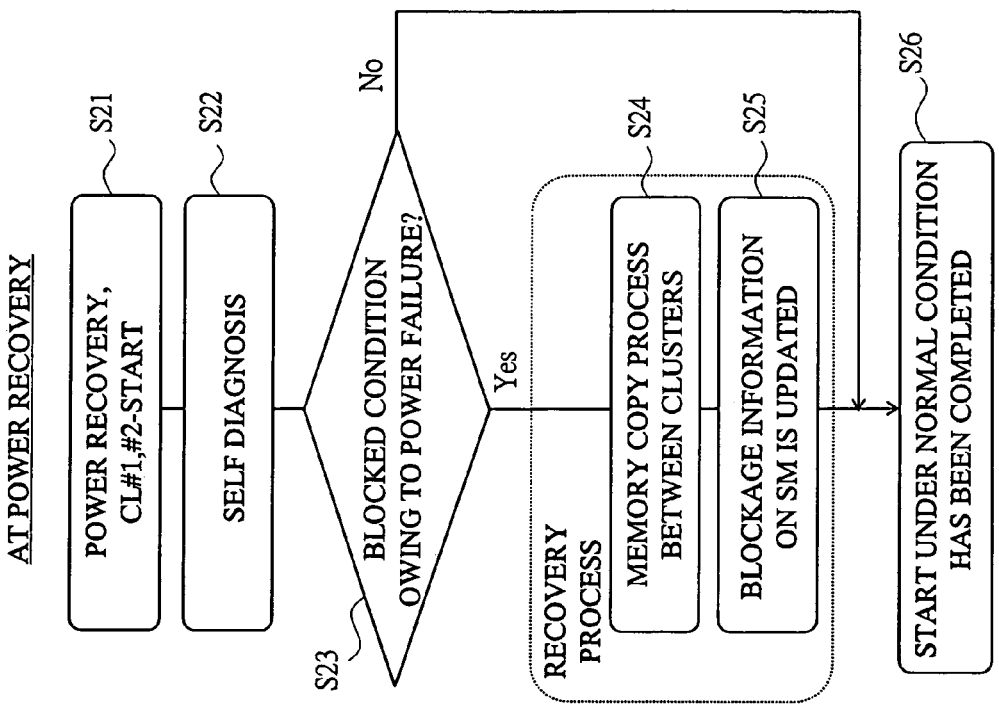
FIG. 6B is a flow chart showing a process to carry out the first control corresponding to the power failure pattern (1) in the first embodiment according to the present invention.
Figure 6A:
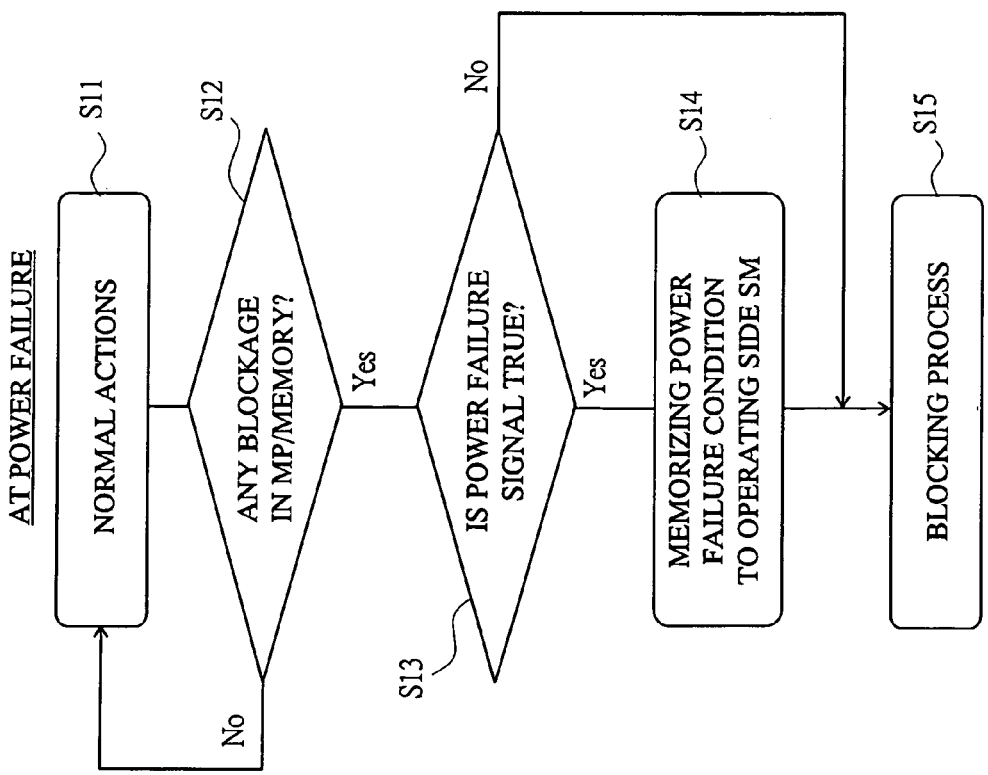
FIG. 6A is a flow chart showing a process to carry out the first control corresponding to the power failure pattern (1) in the first embodiment according to the present invention.

FIG. 6A and FIG. 6B are flow charts showing the process for the first control corresponding to the power failure pattern (1). They correspond to the case where the CL#2 (10B) stops first and the CL#1 (10A) stops thereafter.

FIG. 6A shows the control at a power failure. In step S11, the CLs 10A and 10B carry out normal actions. During the normal actions, at step S12, the CLs 10A and 10B judge whether there is any condition that causes the MP 101 and the memory 102 to shift to blocked condition, or whether blocked condition has already occurred or so, by access and the like for communication and check between the MPs 101. When there is a condition to become the cause of blockage and they are to be shifted to blocked condition or an already occurred blocked condition is recognized (S12-Yes), the procedure goes to the next. For example, whether there is a specified error at normal actions or not is judged, and if there is the specified error, the procedure goes to the next to block the portion concerned.

In step S13, the cluster (CL 10A) that has recognized occurrence of the condition to become the cause of blockage or the blocked condition, about the portion of the opposite cluster (CL 10B) confirms the power failure signal (F#2) from the power failure judging unit 103. When the power failure signal (F#2) is true ("1") (S13-Yes), at step S14, it writes the power failure information ("1") showing that the portion of the objective cluster (CL 10B) is in power failure condition, to the SM 14 of the operating cluster (CL 10A). Thereby, the blocked condition and the power failure condition at the objective portion are interrelated. When the power failure signal (F#2) is false ("0") (S13—No), the process at step S14 is not carried out, and the procedure goes to the next.

In step S15, the cluster (CL 10A) at the operating side carries out the blocking process on the portion of the objective cluster (CL 10B). By the way, this is not necessary if the blocking process has been already made. For example, the portion of the cluster (CL 10B) at the side that stopped operation owing to DC2 power source supply stop is shifted to the blocked condition, and the blockage information ("1") is written to the SM 14 of the cluster (CL 10A) at the operating side. Then, owing to durability limit, both the clusters (CLs 10A and 10B) are finally stopped.

FIG. 6B shows the control at power recovery. In step S21, owing to power recovery, the supply of DC1 and DC2 is restarted, and both the clusters (CLs 10A and 10B) are restarted. In step S22, portions such as respective MPs 101 and the likes in the restarted clusters (CLs 10A and 10B) carry out self diagnosis. The self diagnosis is a process normally done for checking the hardware resources for errors. Those portions free of error in the self diagnosis are started. When their operations are started, by the control at the power failure, the portions (MP 101, memory 102) of one cluster (CL 10B) is in blocked condition.

In step S23, the MP 101 in the cluster (CL 10A) that starts operation in normal condition reads respective information stored in the SM 14, i.e., the blockage information and the power failure information and so forth, and judges whether the cause and circumstance in the portion of blocked condition are a power failure. When the objective portion is in blocked condition owing to power failure (S23-Yes), in steps S24 and S25, self recovery process is carried out.

In the step S24, memory copy process between the clusters (CLs 10A and 10B) is carried out for making the system carry out normal actions. The data contents of the CM 13 and the SM 14 of the cluster (CL 10A) at the operating side are copied to the CM 13 and the CM 14 of the cluster (CL 10B) at the blocked side, and thereby the contents are made same.

In the step S25, the blockage information on the SM 14 is updated, according to the recovery from the blocked condition in the objective portion. Namely, the record of the blockage information is deleted (from "1" to "0").

In step S26, the start of the normal condition of both the clusters (CLs 10A and 10B) has been completed. Namely, the actions of the portion in the blocked condition are restarted.

As explained heretofore, in the first control corresponding to the power failure pattern (1), in a low cost structure of a disk array system that does not require arrangement of the battery 21 and so forth concerning the power source unit of cluster, it is possible to automatically recover the cluster blocked portion at power failure without intervention of maintenance operation at the moment of power recovery. Accordingly, it is possible to shorten the cluster stop time and increase the operation ratio of the disk array system.

Second Embodiment

Figure 7:
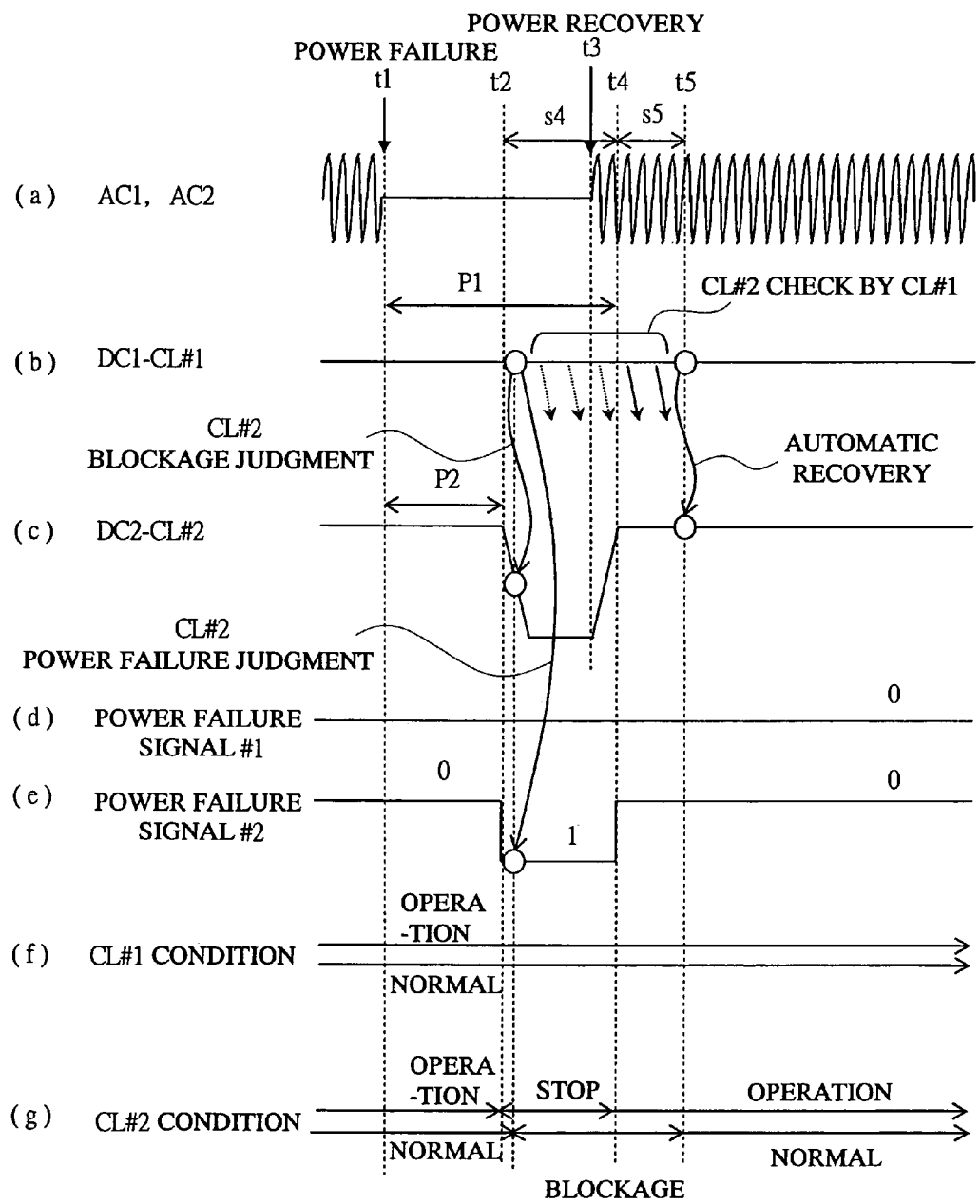
FIG. 7 is a time sequence figure showing an example of the second control corresponding to a power failure pattern (2) and a power failure pattern (2), in a disk array system in a second embodiment according to the present invention.

FIG. 7 and FIG. 8 are figures for explaining a disk array system 1 according to a second embodiment of the present invention. In the second embodiment, in a duplexed structure of DKCs and power source units, as a second control, power failure control and power recovery control corresponding to one cluster operation stop of DKC at occurrence of a short power failure is carried out. In the power failure control, at the blocking process on the portion of the cluster that stops by the cluster that does out stop and continues operation, power failure condition is recognized on the basis of power failure judgment, and condition information in which the occurrence of blocked condition and power failure condition are interrelated is stored in a nonvolatile memory. Then, in the power recovery control, the cluster of the side that continues operation periodically carries out access of action soundness check to the portion of blocked condition in the cluster at the side that has stopped, after the blocking process, and when the action soundness of the objective portion of the cluster at the side that has stopped, the cluster of the side that continues operation automatically recovers the portion. In the second control, because one cluster recognizes that the cause and circumstance of the blocked condition of the cluster at the side that has stopped is owing to a power failure, automatic recovery process is carried out according to the result of the check without procedures of condition information reference after restart in the first control. The control of blockage/recovery and the control of power failure condition and the likes in the second embodiment are same as those in the first embodiment.

<Power Failure Pattern (2)>

FIG. 7 is a time sequence figure showing an example of the second control corresponding to the power failure pattern (2) and the power failure pattern (2). As the power failure pattern (2), there is a case where the power source of one cluster (suppose CL 10B) stops at occurrence of an instantaneous power failure, i.e., a short time power failure, and the power source of the other cluster (suppose CL 10A) does not stop. Owing to the difference in cluster operation stop timings, a portion that gets in blocked condition by blocking condition occurs.

In FIG. 7, from the top, (a) shows conditions of AC1 and AC2, (b) shows DC1 condition and CL#1 (10A) action, (c)

shows DC2 condition and CL#2 (10B) action, (d) shows power failure signal F#1, (e) shows power failure signal F#2, (f) shows operating and blocked conditions of CL#1, and (g) shows operating and blocked conditions of CL#2. The t1 and the likes show time. It is a case where the power failure durability of PS#1 (2A) is larger than the power failure durability of PS#2 (2B), and the power source hold condition by the power failure durability of PS#1 is larger than an instantaneous power failure time. The s4 corresponds to one cluster stop condition, and s5 corresponds to one cluster blocked condition.

(a) In the conditions of AC1 and AC2, at occurrence of an instantaneous power failure at t1, the supply of AC1 and AC2 stops. Thereafter, at power recovery at t3, the supply of AC1 and AC2 is restarted.

(b) In the DC1 condition and the CL#1 action, DC1 durability shown by P1 continues longer than the period from t1 to t4, the supply of DC1 to CL#1 is continued, and CL#1 does not stop.

(c) In the DC2 condition and the CL#2 action, during the DC 2 durability shown by P2 for the period from t1 to t2, the supply of DC2 to CL#2 is continued. At t2, owing to durability limit, the supply of DC2 stops, then at power recovery at t3, the supply of DC2 is restarted at t4, and CL#2 is restarted. At the restart of CL#2, CL#2 carries out self diagnosis and restarts.

(d) In the power failure signal F#1, DC1 supply is continued, therefore "0" is maintained.

(e) In the power failure signal F#2, at the circumstance of DC2 supply stop at t2, "0" is changed into "1", and at the circumstance of DC2 supply restart at t4, "1" is changed into "0".

(f) In the CL#1 condition, the power source is in operating condition. Especially, in the period from blocking process just after t2 to t5, the access of action soundness check to CL#2 by CL#1 is carried out periodically.

(g) In the CL#2 condition, the power source is in operating condition to t2, and in stop condition from t2 to t4, and in operating condition after t4. Further, as for blockage, the period to blocking process time just after t2 shows normal condition, the period from the blocking process time just after t2 to automatic recovery process time at t5 shows blocked condition, and the period after automatic recovery process time at t5 shows normal condition.

In the second control, in the control at power failure, the MP 101 of the cluster (CL#1) at the side that continues operation just after power failure judges the blockage on the portions (MP 101 and memory 102) of the opposite cluster (CL#2) that stopped after a short time of operation, and at the same time, judges the power failure condition of the opposite cluster (CL#2) on the blockage judgment. The cluster (CL#1) at the side that does not stop carries out the blocking process to shift the opposite cluster (CL#2) to blocked condition according to the conventional blocking process, and at the same time, in the case of power failure condition, i.e., operation stop owing to power source supply stop, it reflects the power failure information showing the power failure condition of the opposite cluster (CL#2) on the SM 14 of its own cluster (CL#1). Thereafter, power recovery is made beforehand, as a result, the cluster (CL#1) does not stop its operation.

Then, in the control at power recovery, because the cluster (CL#1) recognizes that the portion of the opposite cluster (CL#2) is in blocked condition owing to a power failure, after the blocking process, by the representative MP 101 of the cluster (#1), access for periodical action soundness check is carried out on the portion in blocked condition of the cluster (CL#2). This check is for checking whether normal actions can be made at the objective portion, and whether there is no problem in recovery from the blocked condition. Thereafter, the cluster (CL#2) is restarted at power recovery, but the portion of one cluster (CL#2) is in blocked condition. When the representative MP 101 of the cluster (CL#1) confirms the action soundness of the portion in blocked condition of the opposite cluster (CL#2) by the check, it automatically recovers the portion. Thereby, in the same manner as in the case of the power failure pattern (1), the cluster is recovered to its normal condition without intervention of the maintenance operation that has been necessary conventionally. By the way, when the cluster (CL#1) that is carrying out the check stops owing to power source stop, the case of the power failure pattern (1) gets in, then the first control may be executed.

In FIG. 7, just after t2, the operating CL#1 carries out the blockage judgment on the stopped CL#2, and the power failure judgment on CL#2 by detection of the power failure signal (F#2). In the blockage judgment, CL#1 carries out blocking process to shift each portion of CL#2 into blocked condition. Meanwhile, in the power failure judgment, because the power failure signal (F#2) is true ("1"), CL#1 recognizes "that CL#2 is in operation stop condition owing to DC2 supply stop". From both the judgments, CL#1 can recognize "that the blocked condition of CL#2 is owing to operation stop by DC supply stop". CL#1 writes the blockage information and the power failure information showing these to the SM 14 of CL#1 as condition information. Further, the operating CL#1, after the blocking process just after t2, by the MP 101, carries out access of periodical action soundness check on the portion in blocked condition of CL#2. The access of the check is carried out at such frequency as not to prevent ordinary data input/output process. By the above check, after t4, soundness of the objective portion of CL#2 that is restarted by power recovery is confirmed.

<Second Control Flow>

Figure 8B:
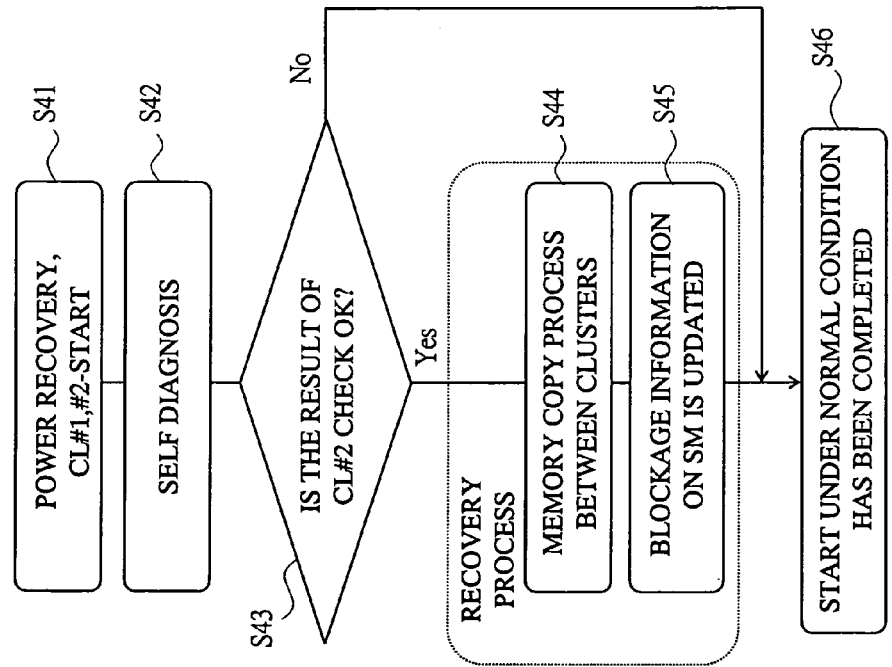
FIG. 8B is a flow chart showing the second control corresponding to a power failure pattern (2) in a disk array system in the second embodiment according to the present invention.
Figure 8A:
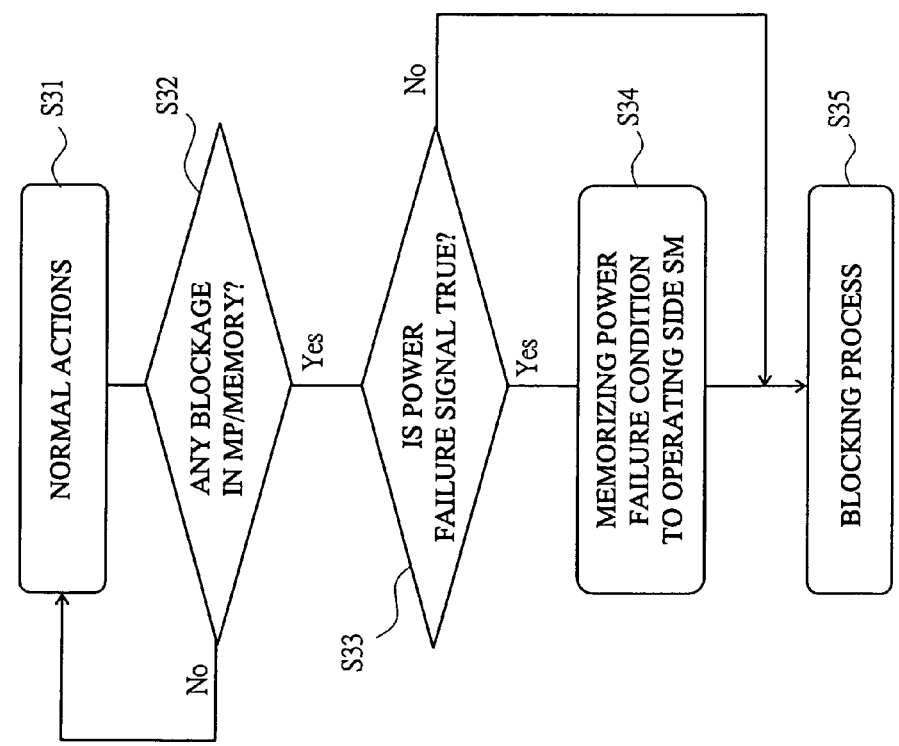
FIG. 8A is a flow chart showing the second control corresponding to a power failure pattern (2) in a disk array system in the second embodiment according to the present invention.

FIG. 8A and FIG. 8B are the flow charts showing the process of the second control corresponding to the power failure pattern (2). The process corresponds to the case where CL#2 (10B) stops first and CL#1 (10A) does not stop as shown in FIG. 7.

FIG. 8A shows the control at a power failure. The processes at steps S31 to S35 are same as in the case of the first control. Only the difference is that just after a power failure, as a result, only one cluster (CL 10B) stops its operation. At the step S35, the cluster (CL 10A) at the side that does not stop blocks the portion of the cluster (CL 10B) at the stop side.

FIG. 8B shows the control at a power recovery. At step S41, at power recovery, the supply of DC2 is restarted, and the cluster (CL 10B) that has stopped is restarted. At step S42, the portions of respective MPs 101 and the likes in the cluster (CL 10B) that is restarted carry out self diagnosis. Those portions without problem in the self diagnosis are operated. When operation is started, the portions (MP 101, memory 102) of the cluster (CL 10B) is in blocked condition by the control at the power failure.

At step S43, the MP 101 in the cluster (CL 10A) that continues its operation in normal condition recognizes that the cause and circumstance of the block in the portion in blocked condition of the objective cluster (CL 10B) were power failure condition, after blocking process at the step S35, it periodically carries out access of the action soundness check on the portion of the cluster (CL 10B) at the stop side. When the check result is OK (S43—Yes), the cluster (CL 10A) that continues its operation executes the automatic recovery process on the objective portion at steps S44 and S45. This automatic recovery process is same as in the case of the first control.

At step S46, the start of the cluster (CL 10B) in normal condition has been completed. Namely, the portion in blocked condition is restarted in normal condition.

As explained above, in the second control corresponding to the power failure pattern (2), in the same manner as in the first control, it is possible to recover the cluster to normal condition without intervention of maintenance operation in a low cost structure of a disk array system, and increase the operation ratio of the disk array system.

Third Embodiment

Figure 9A:
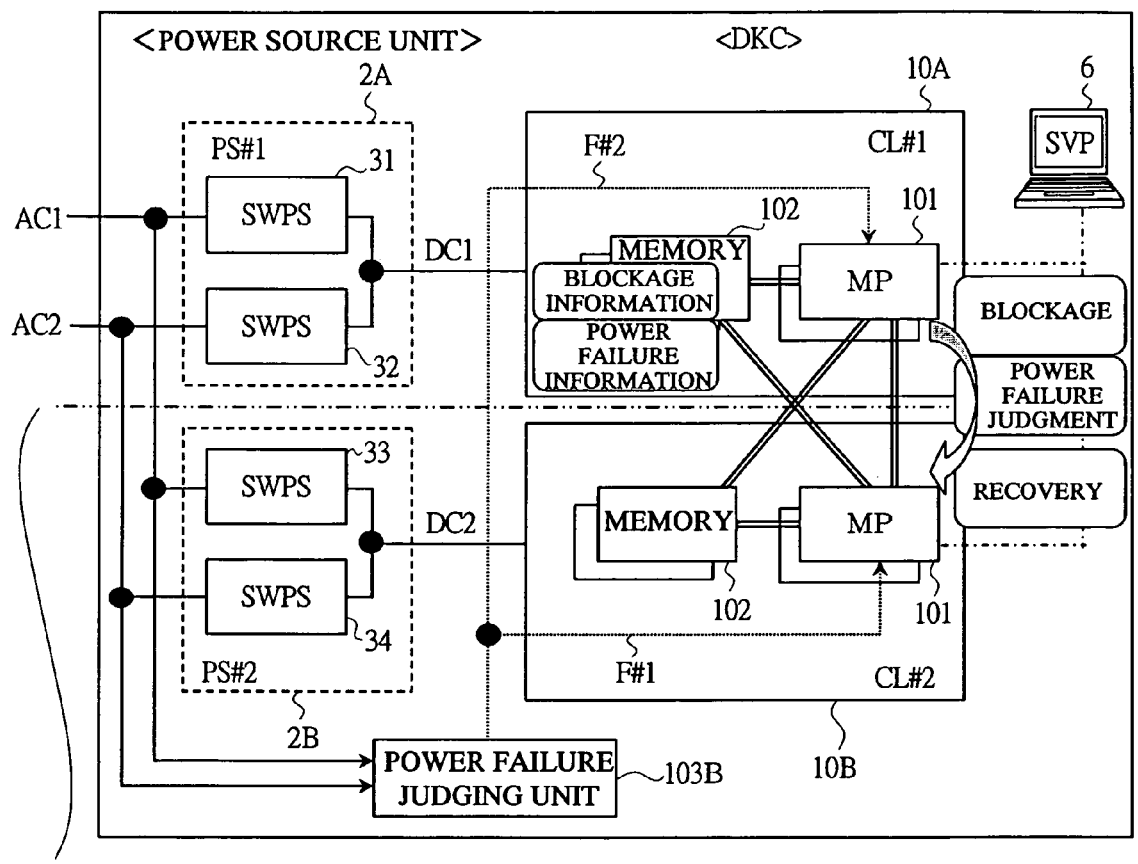
FIG. 9A is a block diagram showing a second structure example of power source units and DKC clusters, concerning control at power failure and recovery in a disk array system in a third embodiment according to the present invention.
Figure 9B:
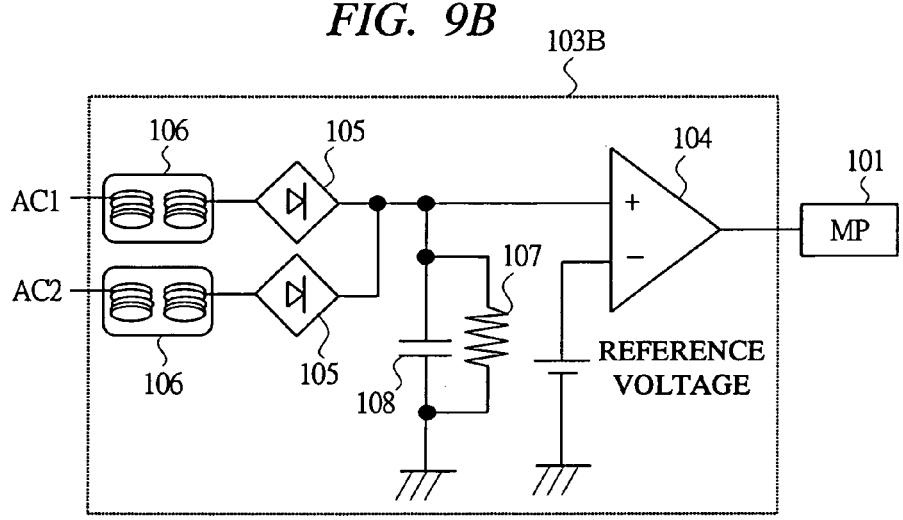
FIG. 9B is a figure showing the detailed structure of a power failure judging unit therein.

FIG. 9A and FIG. 9B are figures for explaining a disk array system 1 according to a third embodiment of the present invention, and are block diagrams showing a second structure example of power source units and clusters, concerning the control at power failure and recovery in the third embodiment. FIG. 9A especially shows the second structure example concerning means for judging power condition, and FIG. 9B shows a detailed structure of a power failure judging unit 103B therein. In the disk array system 1, means for judging power failure condition is structured mainly with the circuit of the AC connected power failure judging unit 103B. In the circuit structure of the third embodiment, a function to execute one or both of the first and second controls shown in the first and second embodiments is arranged.

<Power Source Unit and Cluster Structure (2)>

In FIG. 9A, the present structure is a structure where one power failure judging unit 103B is arranged between input AC power sources (AC1 and AC2) and respective CLs 10A and 10B, and from the power failure judging unit 103B to the respective CLs 10A and 10B, power failure signals F (#2 and #1) showing the power failure conditions at the opposite clusters (CLs 10B and 10A) and output to the MP 101.

The power failure judging unit 103B judges the power failure condition from the input AC power sources (AC1 and AC2). The meanings of the power failure signals F #2 and #1 that are input to the respective CLs 10A and 10B are same as in the case of the first structure example. When AC1 and AC2 stop owing to a power failure, both the power failure signals F #1 and #2 become true ("1").

In FIG. 9B, the power failure judging unit 103B comprises a comparator 104, a diode bridge 105, a transformer 106, a resistor 107, and a capacitor 108. AC1 and AC2 are respectively input to the transformer 106. Outputs that are rectified to DC by the respective diode bridges 105 are input to one terminal of the comparator 104. At the output side of the diode bridge 105, a parallel circuit of the resister 107 and the capacitor 108 is connected. The comparator 104 compares the input into which 2 systems of AC inputs are rectified into DC with a reference voltage, and outputs the result as power failure signals F (#2 and #1) to the MPs 101 of the respective CLs 10A and 10B.

In the case of the present structure where judgment is made on the basis of AC input, time to recognize a power failure occurrence is shorter than the case where judgment is made on the basis of DC. Further, the present structure is of AC connection, therefore the circuit structure thereof becomes a little complicated than the first structure example.

Comparative Examples

Other structure examples that the authors of the present invention have examined for comparison with the embodiments of the present invention are explained hereinafter. As described previously, in a duplexed structure of DKCs and power source units, because operation stop timings of respective clusters are different at occurrence of a power failure, owing to fluctuations of power failure durability of the SWPSs 31 to 34, blocked condition occurs in the portion of clusters by blocking process. As structure examples to cope with the occurrence of blocked condition at a power failure, there are the following comparative examples (1) to (3). In the respective comparative examples (1) to (3), the occurrence of time difference in respective clusters' operation stop timings is prevented.

Figure 10:
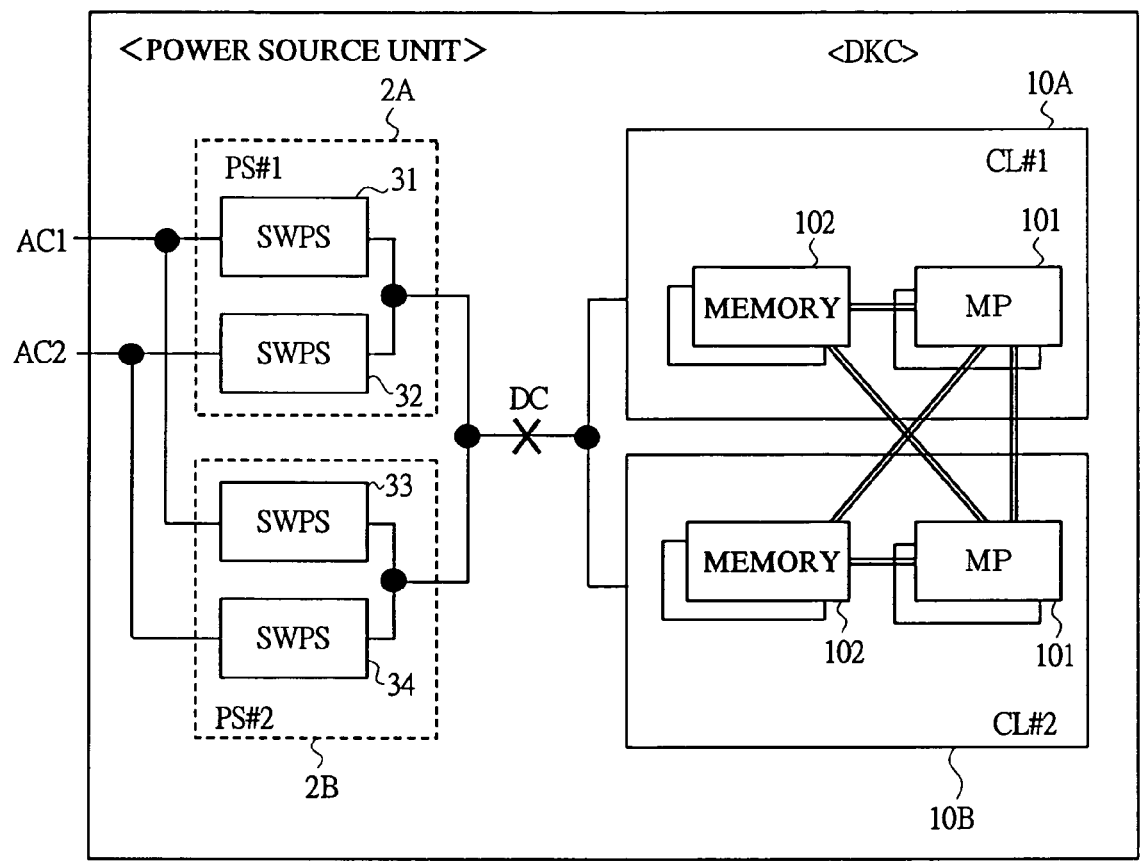
FIG. 10 is an explanatory figure showing a structure of a DKC and a power source unit having one system of DC source power, as a structure for coping with occurrence of blocked condition at power failure, as a comparative example (1) with the embodiment that the authors of the present invention have examined.

As the comparative example (1), a structure is made where one system of a DC power source supply is arranged to clusters. FIG. 10 shows a structure example of DKCs and power source units corresponding to the comparative example (1). It is a structure where the power source boundary shown in FIG. 3 and the like is removed, and the DC output from power source units is made into one system and input to respective clusters. In the case of this structure, clusters' operation stop timings at a power failure become same, therefore, the blocked condition will not occur.

However, in the case of this structure, when a short circuit occurs in one system of DC power source supply line, both the clusters stop their operations, as a consequence, the reliability as a disk array system is low. Accordingly, it is preferable to make the DC power source supply into multiple systems. In the case of the present embodiment, the DC power source supply is made into multiple systems, thereby reliability is secured.

As the comparative example (2), a structure is made where batteries are arranged to respective DC power sources between the power source units and the clusters. For the recovery and return, batteries are held, and just after a power failure, operation is made surely for a specified time and the clusters are stopped according to a plan, thereby the occurrence of the blocked condition is avoided. FIG. 11 shows a structure example of DKCs and power source units corresponding to the comparative example (2). It is a structure where the second structure example shown in FIG. 9A as its base, batteries B1 and B2 are connected to the supply lines DC1 and DC2 from PS2A and PS2B. Thereby, even when the supply of DC1 and DC2 from PS2A and PS2B stops at occurrence of a power failure, by the power source supply from the batteries B1 and B2, the operation of the clusters CLs 10A and 10B is continued for a while. Even after power failure, actions of both the clusters CLs 10A and 10B are continued, therefore, on the basis of power failure judgment by power failure signal from the power failure judging unit 103B, secure stop process is made where the operation stop timings of the clusters CLs 10A and 10B are made same. Thereby, the intervention of maintenance operation at restart after power recovery is made unnecessary.

However, in the case of this structure, it is necessary to load the batteries B1 and B2, as a consequence, the disk array system has to become of high costs, which is disadvantageous. In the case of the present embodiment, because it is unnecessary to load the batteries B1 and B2, the disk array system 1 may be structures at low costs.

As the comparative example (3), a structure is made where power failure detecting unit is arranged in the structure of power source units, thereby DC output stop timings from respective SWPSs are made same. FIG. 12 shows a structure example of DKCs and power source units corresponding to the comparative example (3). It is a structure where a power failure detecting timer 91 is added to each of the SWPSs 31 to 34. In the SWPSs 31 to 34, output in which AC input is rectified into DC by a diode bridge 115 is input to a power factor improving unit 120, and the output of the power factor improving unit 120 is DC output via a capacitor 118 and a transformer 116. Further, the power failure detecting timer 91 is connected to between the diode bridge 115 and the power factor improving unit 120, and the output of the diode bridge 115 is input to the power failure detecting timer 91, and power failure time is counted. In the SWPSs 31 to 34, the power failure time is counted by the power failure detecting timer 91, and DC output of own SWPSs 31 to 34 is stopped at a predetermined time. A stop signal is output from the power failure detecting timer 91 to the power factor improving unit 120 and DC output is stopped. Thereby, the operation stop timings of the respective CLs 10A and 10B are made same.

However, in the case of this structure, it is difficult to improve the precision of the stop time of the respective SWPSs 31 to 34. Further, it is necessary to arrange an exclusive circuit to each of the SWPSs 31 to 34, leading to high costs. Further, for example a structure may be considered where an exclusive circuit for making same the stop timings is arranged between the SWPSs 31 to 34, however, power source units have to become complicated, leading to high costs in the same manner. In the case of the present embodiment, it is unnecessary to make same the stop times of the SWPSs 31 to 34.

Further, according to the art described in Japan Patent Application Publication No. 9-325836, where device conditions are stored for a specified period before a power failure, the load thereof is large. On the other hand, in the present embodiment, where condition information is stored according to the instance of occurrence of power source supply stop to objective portion and blocked condition owing to a power failure, the load thereof is small.

As explained heretofore, according to the embodiments, it is possible to realize an automatic recovery process in a short time without intervention of maintenance workers at power failure and recovery. By automatic recovery of blocked condition of the portion that has occurred at power failure, at power recovery, the operation ratio of a disk array system is improved. Further, fluctuations in power failure durability of SWPSs 31 to 34 are permitted, therefore, it is possible to adopt low cost power source units, and to realize automatic recovery by a low cost structure. Furthermore, it is possible to make unnecessary a high cost structure of a disk array system owing to arrangement of a battery backup function for holding power sources at a power failure. Moreover, judgment and control are carried out only at occurrence of blockage, therefore, in normal operation, loads for condition confirmation and judgment in DKC 10 are small.

Heretofore, the invention made by the present inventor have been explained in details by reference to the embodiments, however, it is known to those skilled in the art that the present invention is not limited to the embodiments herein, but the present invention may be embodied in other specific forms without departing from the spirit or essential characteristics thereof.

The present invention may be applied to devices such as a disk array system and information processing systems, having multiplexed power source units and multiplexed device portions to which power sources are supplied from these power source units.

What is claimed is:

1. A disk array system having a storage device and a storage control device for controlling data storing to the storage device, wherein the storage control device has a structure of multiplexed clusters, each cluster has a processor, a memory, and a power judging circuit that judges power source conditions of at least another one of the clusters by directly inputting therein a power from a power source of said another cluster thereby outputting a signal to the processor thereof, and the storage control device has multiplexed power source units that respectively supply power to the clusters, and in performing control that is executed by one operating cluster in response to a case where at least a portion of another cluster stops operation first at a failure:

as the control at failure, said operating cluster blocks the stopped portion of said another cluster, judges a power source condition of said another cluster on the basis of the signal from the power judging circuit to determine whether a power failure occurs in the power source of said another cluster, and then said operating cluster records and stores information showing the power source condition of said another cluster and a in result to the memory thereof, and as the control at recovery, if the operating cluster determines that the blocked portion of said another cluster is in blocked condition owing to the power failure occurs in the power source, the operating cluster recovers the blocked portion to operate normally, and if the cluster determines that the blocked portion of said another cluster is in blocked condition not owing to the power failure occurs in the power source, the operating cluster does not recover the blocked portion.

2. The disk array system according to claim 1, wherein the power source units has a structure having an AC-DC power source unit, and the AC-DC power source unit has plural switching power sources, and different systems of AC power sources are input to the respective switching power sources to perform AC-DC conversion so as to output DC power sources to corresponding clusters, and the switching power sources outputs of the DC power sources at different timings due to a power failure depending upon differences of power failure durability, and the processor of each cluster controls the memory in own cluster, communications with the processor of said another cluster, and the memory of said another cluster, and carries out the blocking process, the power source condition judgment, and the recovery process.

3. The disk array system according to claim 1, wherein all the clusters stop their operations at different time points after the power failure, and then recover their operations substantially at the same time after the power source is recovered.

4. The disk array system according to claim 1, wherein only one of the clusters stop its operation after the power failure, and then recover its operation after the power source is recovered.

5. The disk array system according to claim 4, wherein the operating cluster checks the blocked portion periodically for soundness since the portion is block until the blocked portion is recovered to operate normally.

6. The disk array system according to claim 1, wherein
the power judging circuit judges a DC power source supply condition from the power source units of said another cluster.

7. The disk array system according to claim 1, wherein on the memory, information showing the blocked condition is controlled per location of the portion in the storage control device, and information showing the judgment result of the power source condition of the clusters is controlled per the processor.

8. The disk array system according to claim 1, wherein
a maintenance/control device connected for communications to the clusters is arranged, and
by instructions from the maintenance/control device to the clusters, and a processor that becomes representative carried out a control at the power failure and power recovery.

9. The disk array system according to claim 1, wherein batteries are not connected in the power source supply line from the power source units to the clusters.

10. The disk array system according to claim 1, wherein each cluster has a channel controlling unit (CHA), a disk controlling unit (DKA), a cache memory (CM), and a shared memory (SM), and said portion of said another cluster is the CHA, the DKA, the CM, or the SM.

11. The disk array system according to claim 1, wherein the clusters share a channel controlling unit (CHA), a disk controlling unit (DKA), a cache memory (CM), and a shared memory (SM), and said portion of said another cluster is a portion of the CHA, the DKA, the CM, or the SM.

12. The disk array system according to claim 1, wherein each cluster has at least one additional processor, and at least one additional memory.

13. The disk array system according to claim 1, wherein said another cluster is in blocked condition owing to a hardware failure therefore not owing to the power failure.

14. A disk array system having a storage device and a storage control device for controlling data storing to the storage device, wherein
the storage control device has a structure of multiplexed clusters, each cluster has a processor and a memory,
the storage control device has multiplexed power source units that respectively supply power to the clusters,
a power judging circuit judges power source conditions of the clusters by directly inputting therein an AC power from a power source of one of the clusters thereby outputting a signal showing a power source condition of said one cluster to the processor of another one of the clusters, and power judging circuit is arranged between the power source units and the clusters,
in performing control that is executed by one operating cluster in response to a case where at least a portion of another cluster stops operation first at a failure:
as the control at failure, said operating cluster blocks the stopped portion of said another cluster, judges a power source condition of said another cluster on the basis of the signal from the power judging circuit to determine whether a power failure occurs in the power source of said another cluster, and then said operating cluster records and stores information showing the power source condition of said another cluster and a judging result to the memory thereof, and
as the control at recovery, if the operating cluster determines that the blocked portion of said another cluster is in blocked condition owing to the power failure occurs in the power source, the operating cluster recovers the blocked portion to operate normally, and if the operating cluster determines that the blocked portion if said another cluster is in blocked condition not owing to the power failure occurs in the power source, the operating cluster does not recover the blocked portion.

15. The disk array system according to claim 14, wherein each cluster has a channel controlling unit (CHA), a disk controlling unit (DKA), a cache memory (CM), and a shared memory (SM), and said portion of said another cluster is the CHA, the DKA, the CM, or the SM.

16. The disk array system according to claim 14, wherein the clusters share a channel controlling unit (CHA), a disk controlling unit (DKA), a cache memory (CM), and a shared memory (SM), and said portion of said another cluster is a portion of the CHA, the DKA, the CM, or the SM.

17. A disk array system having a storage device and a storage control device for controlling data storing to the storage device, wherein
the storage control device has a structure of duplexed clusters, each cluster has a processor, a memory, and a power judging circuit that judges power source conditions of at least another one of the clusters by directly inputting therein a power from a power source of said another cluster thereby outputting a signal to the processor thereof, and the storage control device has duplexed power source units that supply power to the clusters, and
the storage control device comprises a channel controlling unit (CHA) equipped with the processor that carries out a communication interface process with other devices, a disk controlling unit (DKA) equipped with the processor that carries out a communication interface process with the storage device, a cache memory unit (CM) for data cache, a shared memory unit (SM) for storing condition information, and a connecting unit that connect the units mutually, and
the processor of each cluster controls the memory in own cluster, communications with the processor of the other cluster, and control to the memory of the other cluster, and
the power source units has a structure having an AC-DC power source umt, and the AC-DC power source unit has plural switching power sources, and different systems of AC power sources are input to the respective switching power sources to perform AC-DC conversion to output DC power sources to corresponding clusters, and the switching power sources stop outputs of the DC power sources at different timings due to a power failure depending upon differences of power failure durability, and
in performing control that is executed by one operating cluster in response to a case where at least one portion of another cluster stops operation first at a failure:
as the control at failure, the processor of said operating cluster blocks the stopped portion of said another cluster judges a power source condition of said another cluster on the basis of the signal from the power judging circuit to determine whether a power failure occurs in the power source of said another cluster, and then said operating cluster records and stores information showing the power source condition of said another cluster and a judging result to the shared memory thereof, and
as the control at recovery, if the processor of the operating cluster determines that the blocked portion of said another cluster is in blocked condition owing to the power failure occurs in the power source, the processor of the operating cluster recovers the blocked portion to operate normally, and if the operating cluster determines that the blocked portion if said another cluster is in blocked condition not owing to the power failure occurs in the power source, the operating cluster does not recover the blocked portion.

18. The disk array system according to claim 17, wherein said portion of said another cluster is a portion of the CHA, the DKA, the CM, or the SM.

* * * * *